United States Patent
Takano

(10) Patent No.: US 11,750,259 B2
(45) Date of Patent: Sep. 5, 2023

(54) APPARATUS AND METHOD

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 16/936,453

(22) Filed: Jul. 23, 2020

(65) Prior Publication Data

US 2020/0358510 A1 Nov. 12, 2020

Related U.S. Application Data

(63) Continuation of application No. 15/755,579, filed as application No. PCT/JP2016/073332 on Aug. 8, 2016, now Pat. No. 10,727,921.

(30) Foreign Application Priority Data

Nov. 5, 2015 (JP) .................................. 2015-217673

(51) Int. Cl.
*H04B 7/06* (2006.01)
*H04W 16/28* (2009.01)
(Continued)

(52) U.S. Cl.
CPC ......... *H04B 7/0632* (2013.01); *H04B 7/0417* (2013.01); *H04B 7/0478* (2013.01); *H04B 7/0617* (2013.01); *H04B 17/21* (2015.01); *H04B 17/24* (2015.01); *H04B 17/309* (2015.01); *H04B 17/318* (2015.01); *H04B 17/345* (2015.01); *H04L 1/0026* (2013.01);
(Continued)

(58) Field of Classification Search
None
See application file for complete search history.

(56) References Cited

U.S. PATENT DOCUMENTS

| | | | |
|---|---|---|---|
| 2012/0040701 A1 | 2/2012 | Tong et al. | |
| 2012/0087273 A1* | 4/2012 | Koo | H04W 16/02 370/252 |

(Continued)

FOREIGN PATENT DOCUMENTS

| | | |
|---|---|---|
| CN | 103053195 A | 4/2013 |
| JP | 2014-53611 A | 3/2014 |

(Continued)

OTHER PUBLICATIONS

Extended European Search Report dated Oct. 17, 2018 in European Application No. 16681822.1-1215.

(Continued)

*Primary Examiner* — Anez C Ebrahim
(74) *Attorney, Agent, or Firm* — XSENSUS LLP

(57) ABSTRACT

[Object] To provide a mechanism capable of more appropriately ascertaining an interference condition of a data signal.

[Solution] An apparatus includes: a processing unit that feeds back a channel quality indicator (CQI) of a serving base station, which is calculated on a basis of results of measuring reference signals received from the serving base station and a neighbor base station and information related to a power difference between the reference signal and a data signal of the neighbor base station, to the serving base station.

16 Claims, 19 Drawing Sheets

(51) Int. Cl.
- *H04B 17/24* (2015.01)
- *H04B 17/21* (2015.01)
- *H04L 25/02* (2006.01)
- *H04B 17/318* (2015.01)
- *H04B 17/309* (2015.01)
- *H04B 7/0456* (2017.01)
- *H04L 1/00* (2006.01)
- *H04B 17/345* (2015.01)
- *H04B 7/0417* (2017.01)
- *H04W 24/08* (2009.01)

(52) U.S. Cl.
CPC ......... *H04L 25/0202* (2013.01); *H04W 16/28* (2013.01); *H04W 24/08* (2013.01)

(56) References Cited

U.S. PATENT DOCUMENTS

| | | | |
|---|---|---|---|
| 2013/0208604 A1* | 8/2013 | Lee | H04L 5/0037 370/252 |
| 2013/0273930 A1 | 10/2013 | Damnjanovic et al. | |
| 2015/0023194 A1 | 1/2015 | Seo et al. | |
| 2015/0029875 A1 | 1/2015 | Zhu et al. | |
| 2015/0215927 A1* | 7/2015 | Amirijoo | H04W 16/10 370/329 |
| 2015/0288474 A1* | 10/2015 | Fujishiro | H04W 72/085 370/252 |
| 2015/0365153 A1* | 12/2015 | Kim | H04B 7/0486 370/329 |
| 2016/0006521 A1 | 1/2016 | Yoshimoto et al. | |

FOREIGN PATENT DOCUMENTS

| | | |
|---|---|---|
| JP | 2014-64294 A | 4/2014 |
| JP | 2014-204305 A | 10/2014 |
| JP | 2014204278 A | 10/2014 |
| JP | 2014-239501 A | 12/2014 |
| JP | 2015-508609 A | 3/2015 |
| JP | 2015073291 A | 4/2015 |
| JP | 2015126414 A | 7/2015 |
| WO | 2010/106819 A1 | 9/2010 |
| WO | 2012/149208 A1 | 11/2012 |
| WO | 2014/136620 A1 | 9/2014 |
| WO | WO-2015098250 A1 | 7/2015 |

OTHER PUBLICATIONS

International Search Report dated Oct. 25, 2016 PCT/JP2016/073332 filed Aug. 8, 2016.

* cited by examiner

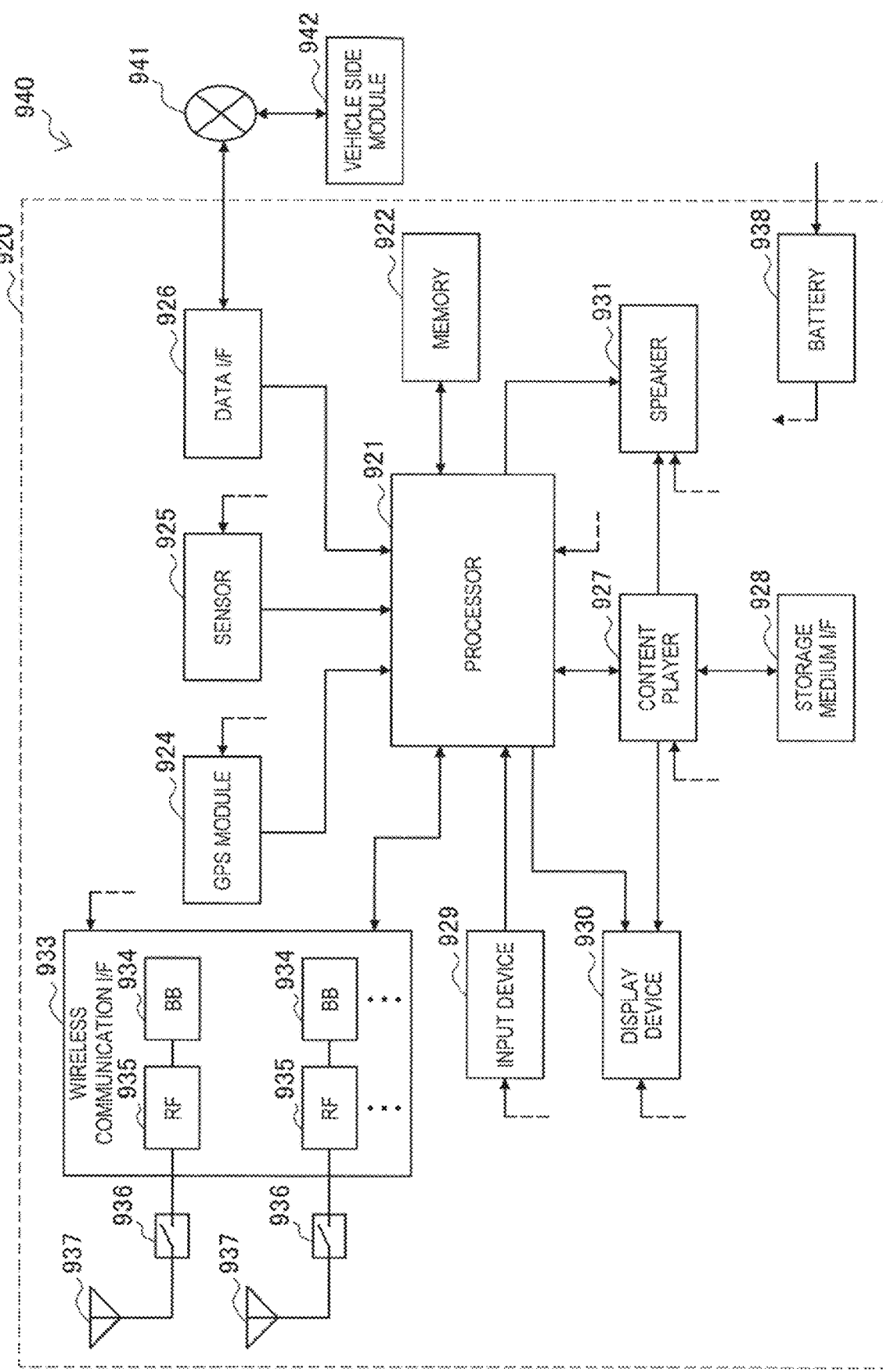

APPARATUS AND METHOD

CROSS-REFERENCE TO RELATED APPLICATIONS

The present application is a continuation of U.S. application Ser. No. 15/755,579, filed Feb. 27, 2018, which is based on PCT filing PCT/JP2016/073332, filed Aug. 8, 2016, which claims priority to JP 2015-217673, filed Nov. 5, 2015, the entire contents of each are incorporated herein by reference.

TECHNICAL FIELD

The present disclosure relates to apparatuses and methods.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed.

For example, Patent Literatures 1 to 3 disclose techniques applied when a directional beam aimed in a three-dimensional direction is used.

CITATION LIST

Patent Literature

Patent Literature 1: JP 2014-204305A
Patent Literature 2: JP 2014-53811A
Patent Literature 3: JP 2014-64294A

DISCLOSURE OF INVENTION

Technical Problem

Measurement of a CQI in UE is performed mainly on the basis of a result of measuring a received power of a reference signal. However, there is a case in which a difference occurs between the received power of the reference signal and the received power of a data signal. This difference can similarly occur in a signal from a serving eNB and a signal from a neighbor eNB. Therefore, there is a case in which a CQI that indicates an interference condition of the reference signal that is different from an interference condition of the data signal is fed back to eNB.

Thus, it is desirable to provide a mechanism capable of more appropriately ascertaining an interference condition of a data signal.

Solution to Problem

According to the present disclosure, there is provided an apparatus including: a processing unit that feeds back a channel quality indicator (CQI) of a serving base station, which is calculated on a basis of results of measuring reference signals received from the serving base station and a neighbor base station and information related to a power difference between the reference signal and a data signal of the neighbor base station, to the serving base station.

In addition, according to the present disclosure, there is provided an apparatus including: a processing unit that provides a notification of information related to a power difference between a reference signal and a data signal of a neighbor base station to a terminal apparatus under the control of the apparatus and receives feedback of a CQI that is calculated on a basis of results of measuring reference signals that are received from a serving base station and the neighbor base station and information related to the difference from the terminal apparatus.

In addition, according to the present disclosure, there is provided a method including: feeding back a channel quality indicator (CQI) of a serving base station, which is calculated on a basis of results of measuring reference signals received from the serving base station and a neighbor base station and information related to a power difference between the reference signal and a data signal of the neighbor base station, to the serving base station.

Advantageous Effects of Invention

According to the present disclosure, a mechanism capable of more appropriately ascertaining an interference condition of a data signal is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 20 is a block diagram illustrating an example of a schematic configuration of a car navigation apparatus.

MODE(S) FOR CARRYING OUT THE INVENTION

Figure 1:
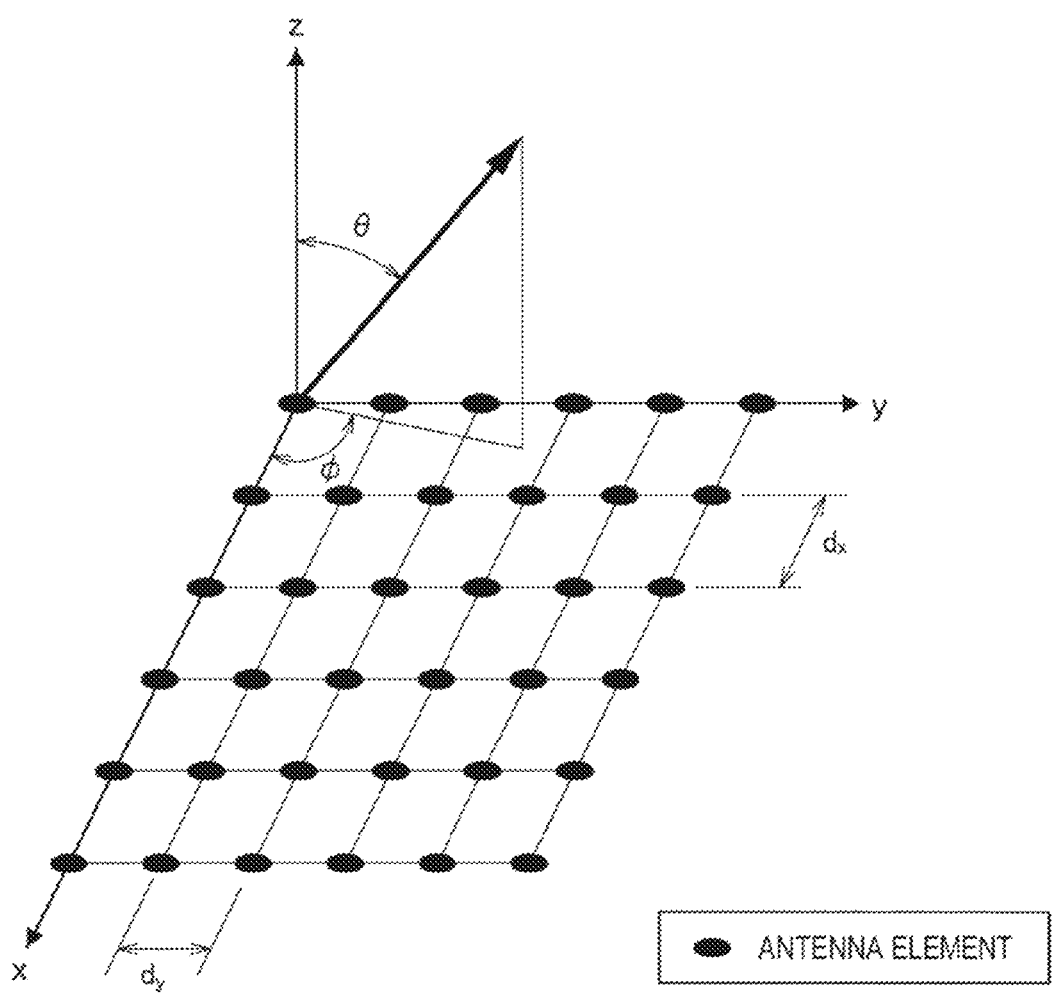
FIG. 1 is a diagram for describing a weight set for large-scale MIMO beamforming.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are cases in the present specification and the diagrams in which constituent elements having substantially the same functional configuration are distinguished from each other by affixing different letters to the same reference numbers. For example, a plurality of constituent elements having substantially the same functional configuration are distinguished, like neighbor base stations 300A and 300B, if necessary. However, when there is no particular need to distinguish a plurality of constituent elements having substantially the same functional configuration from each other, only the same reference number is affixed thereto. For example, when there is no particular need to distinguish neighbor base stations 300A and 300B, they are referred to simply as neighbor base stations 300.

Note that the description will be given in the following order.
1. Introduction
1.1. Related techniques
1.2. Consideration related to embodiment of the present disclosure
2. Configuration example
2.1. Schematic configuration example of system
2.2. Configuration example of base station
2.3. Configuration of terminal apparatus
3. First embodiment
3.1. Technical problems
3.2. Technical features
4. Second embodiment
4.1. Technical problems
4.2. Technical features
5. Application examples
6. Conclusion

1. INTRODUCTION

First of all, techniques related to an embodiment of the present disclosure and consideration related to the present embodiment will be described with reference to FIGS. 1 to 5.

1.1. Related Techniques

Beamforming and measurement will be described as techniques related to an embodiment of the present disclosure with reference to FIGS. 1 to 4.
(1) Beamforming
(a) Necessity of Large-Scale MIMO In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that eNode B is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNode B to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, the direction of a beam can be changed in the horizontal direction. Therefore, it can be said that the typical beamforming is two-dimensional beamforming. Meanwhile, in large-scale MIMO (or massive MIMO) beamforming, the direction of a beam can be changed in the vertical direction as well as the horizontal direction. Therefore, it can be said that large-scale MIMO beamforming is three-dimensional beamforming.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of UE, and therefore, it is more reasonable to increase the number of MU-MIMO users than to increase the number of streams for a single piece of UE.

(b) Weight Set

A set of weight for beamforming are represented by a complex number (i.e., a set of weight coefficients for a plurality of antenna elements). An example of a weight set particularly for large-scale MIMO beamforming will now be described with reference to FIG. 1.

FIG. 1 is a diagram for describing a weight set for large-scale MIMO beamforming. FIG. 1 shows antenna elements arranged in a grid pattern. In addition, FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis. In this case, for example, the weight coefficient $V_{m,n}$ of an antenna element which is m-th in the x-axis direction and n-th in the y-axis direction is represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, \ y=(n-1)d_y$$ [Math. 2]

A weight set for typical beamforming (two-dimensional beamforming) may be divided into a weight set for acquiring directivity in the horizontal direction and a weight set for phase adjustment of dual layer MIMO (i.e., a weight set for phase adjustment between two antenna subarrays corresponding to different polarized waves). On the other hand, a weight set for beamforming of large-scale MIMO (three-dimensional beamforming) may be divided into a first weight set for acquiring directivity in the horizontal direction, a second weight set for acquiring directivity in the vertical direction, and a third weight set for phase adjustment of dual layer MIMO.

(c) Change in Environment Due to Large-Scale MIMO Beamforming

When large-scale MIMO beamforming is performed, the gain reaches 10 dB or more. In a cellular system employing the above beamforming, a significant change in radio wave environment may occur compared to a conventional cellular system.

(d) Case where Large-Scale MIMO Beamforming is Performed

For example, a base station in urban areas may form a beam aimed at a high-rise building. Also, even in rural areas, a base station of a small cell may form a beam aimed at an area around the base station. Note that it is highly likely that a base station of a macro-cell in rural areas does not perform large-scale MIMO beamforming.

Figure 2:
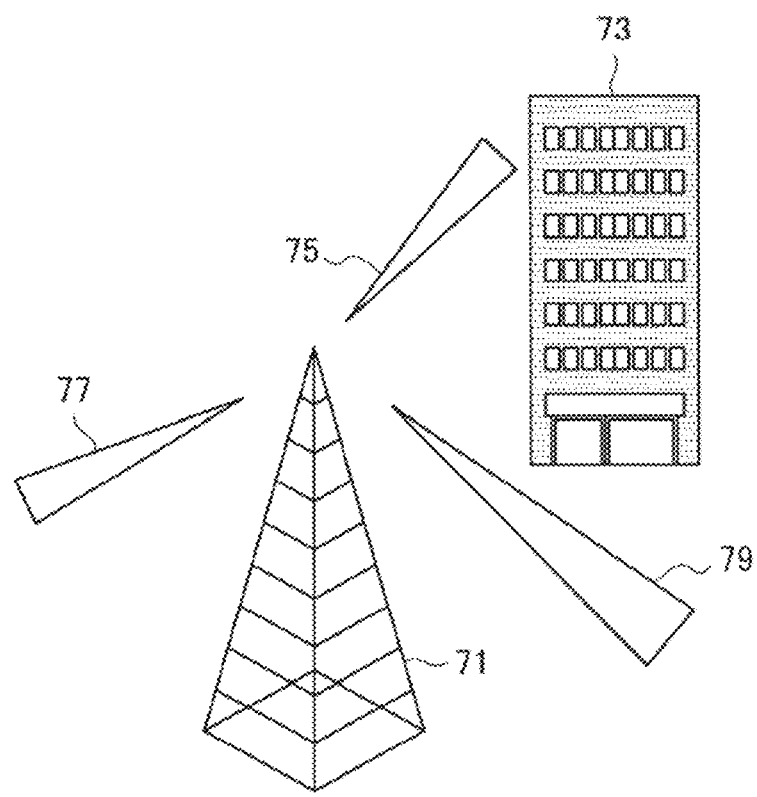
FIG. 2 is a diagram for describing an example of a case in which beamforming of large-scale MIMO is performed.

FIG. 2 is a diagram for describing an example of a case in which beamforming of large-scale MIMO is performed.

Referring to FIG. 2, a base station 71 and a high-rise building 73 are illustrated. For example, the base station 71 forms a directional beam 79 toward the high-rise building 73 in addition to directional beams 75 and 77 toward the ground.

(2) Measurement

Measurement includes measurement for selecting a cell and measurement for feeding back a channel quality indicator (CQI) and the like after connection. The latter is required to be performed in a shorter time. Measurement of an amount of interference from a neighbor cell as well as measurement of quality of a serving cell may be considered as a kind of such CQI measurement.

(a) CQI Measurement

Although a cell-specific reference signal (CRS) may be used for CQI measurement, a channel state information reference signal (CSI-RS) has mainly been used for CQI measurement since release 10.

A CSI-RS is transmitted without beamforming, similar to a CRS. That is, the CSI-RS is transmitted without being multiplied by a weight set for beamforming, similar to a CRS. A specific example of this will be described with reference to FIG. 3.

Figure 3:
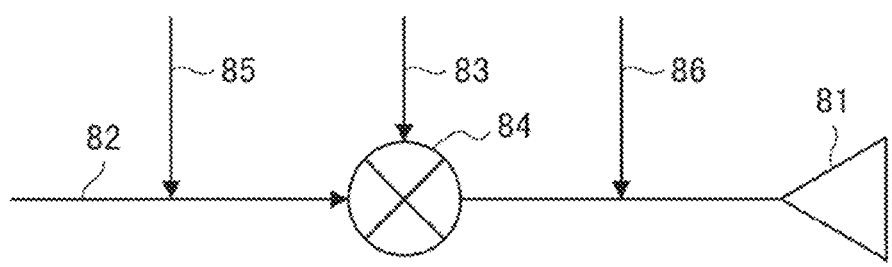
FIG. 3 is a diagram for describing a relationship between multiplication of weight coefficients and insertion of a reference signal.

FIG. 3 is a diagram for describing the relationship between multiplication of weight coefficients and insertion (or mapping) of a reference signal. Referring to FIG. 3, a transmission signal 82 corresponding to each antenna element 81 is complex-multiplied by a weight coefficient 83 by a multiplier 84. Thereafter, the transmission signal 82 complex-multiplied by the weight coefficient 83 is transmitted from the antenna element 81. Also, a demodulation reference signal (DM-RS) 85 is inserted before the multiplier 84, and is complex-multiplied by the weight coefficient 83 by the multiplier 84. Thereafter, the DM-RS 85 complex-multiplied by the weight coefficient 83 is transmitted from the antenna element 81. Meanwhile, a CRS 86 (and a CSI-RS) is inserted after the multiplier 84. Thereafter, the CRS 86 (and the CSI-RS) is transmitted from the antenna element 81 without being multiplied by the weight coefficient 83.

Since a CSI-RS is transmitted without beamforming as described above, a pure channel (or a channel response H) which is not affected by beamforming is estimated when measurement of the CSI-RS is performed. This channel H is used and a rank indicator (RI), a precoding matrix indicator (PMI) and a channel quality indicator (CQI) are fed back. Note that only a CQI is fed back depending on a transmission mode. Also, an amount of interference may be fed back.

(b) CSI-RS

Since a CSI-RS is transmitted without beamforming before release 12 as described above, the pure channel H which is not affected by beamforming is estimated when measurement of the CSI-RS is performed. Accordingly, the CSI-RS has been operated like a CRS.

A CRS is used for cell selection, synchronization and the like and thus a CRS transmission frequency is higher than a CSI-RS transmission frequency. That is, a CSI-RS period is longer than a CRS period.

There may be a first approach for transmitting a CSI-RS without beamforming and a second approach for transmitting a CSI-RS with beamforming (i.e., transmitting a CSI-RS over a directional beam) in a large-scale MIMO environment. It can be said that the first approach is a conventional approach and the second approach is a new approach. A relationship between multiplication by a weight coefficient and insertion of a reference signal in the new approach (second approach) will be described below with reference to FIG. 4.

Figure 4:
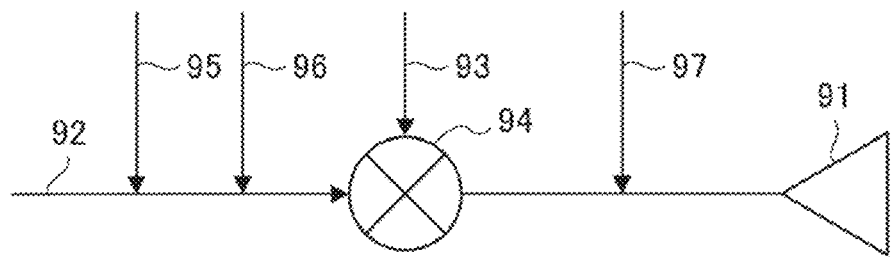
FIG. 4 is a diagram for describing a relationship between multiplication by a weight coefficient and insertion of a reference signal in a new approach.

FIG. 4 is a diagram for describing relationship between multiplication by a weight coefficient and insertion (or mapping) of a reference signal in the new approach. Referring to FIG. 4, a transmission signal 92 corresponding to each antenna element 91 is complex-multiplied by a weight coefficient 93 by a multiplier 94. Thereafter, the transmission signal 92 complex-multiplied by the weight coefficient 93 is transmitted from the antenna element 91. Also, a DM-RS 95 is inserted before the multiplier 94, and is complex-multiplied by the weight coefficient 93 by the multiplier 94. Thereafter, the DM-RS 95 complex-multiplied by the weight coefficient 93 is transmitted from the antenna element 91. Further, a CSI-RS 96 is inserted in front of the multiplier 94, and is complex-multiplied by the weight coefficient 93 in the multiplier 94. Then, the CSI-RS 96 complex-multiplied by the weight coefficient 93 is transmitted from the antenna element 91. Meanwhile, a CRS 97 (and a normal CSI-RS) is inserted after the multiplier 94. Thereafter, the CRS 97 (and the normal CSI-RS) is transmitted from the antenna element 91 without being multiplied by the weight coefficient 93.

1.2. Consideration Related to Embodiment of Present Disclosure

Consideration related to an embodiment of the present disclosure will be described with reference to FIG. 5.
(1) CSI-RS A CSI-RS is defined in release 10. A normal CSI-RS is also referred to as a non-zero-power CSI-RS. The purpose of the CSI-RS is to acquire a pure channel and thus the CSI-RS is transmitted without beamforming.

Also, a zero-power CSI-RS is defined. The zero-power CSI-RS is defined in order to enable easy observation of relatively weak signals from other eNBs. Since an eNB does not transmit a signal in radio resources (resource elements) for the zero-power CSI-RS, a UE can receive signals from other eNBs in the radio resources. The zero-power CSI-RS is also referred to as an interference measurement resource (IMR).

A CSI-RS period is variable between 5 ms and 80 ms. In addition, 400 radio resources are prepared in one subframe as candidates for radio resources in which the CSI-RS is transmitted.

Conventionally, only one CSI-RS is configured for one cell. On the other hand, a plurality of zero-power CSI-RSs can be configured for one cell. Accordingly, when a serving eNB of a UE configures a zero-power CSI-RS in accordance with a configuration of a CSI-RS of a neighbor eNB, the UE can perform measurement of the CSI-RS of the neighbor eNB without being affected by a signal from the serving eNB.

Note that a CSI-RS configuration is cell-specific. A UE may be notified of the configuration through signaling of a higher layer.

The embodiment is based on the assumption that the approach of transmitting the CSI-RS with beamforming, which has been described above with reference to FIG. 4, is employed. However, an approach of transmitting the CSI-RS with no beamforming may also be employed according to the embodiment. That is, a case in which only the CSI-RS with beamforming is transmitted and a case in which the CSI-RS with beamforming and the CSI-RS with no beamforming are present together are assumed according to the embodiment.

(2) Necessity of Optimization of Beamforming

When only a desired directional beam arrives at a UE, the UE can obtain high received quality. On the other hand, when not only a desired directional beam but also other directional beams arrive at a UE, received quality of the UE may deteriorate. For example, an interference can occur between reflected beams, and reception quality can deteriorate in an environment with a large number of reflected waves. In addition, an interference with beams from the neighbor eNB can occur, for example, and reception quality can deteriorate.

In order to suppress such interference, first of all, it is important for an eNB to ascertain a situation of interference of a directional beam. A UE reporting a situation of interference of a directional beam to the eNB is considered because the eNB cannot be aware of the situation of such interference of the directional beam. For example, calculating an amount of interference of a directional beam other than a desired directional beam from a CSI-RS is considered. Also, use of a CSI feedback procedure is considered.

In general, there are two types of channel quality measurement. One type is radio resource management (RRM) measurement such as measurement of reference signal received power (RSRP) and reference signal received quality (RSRQ) and the other is measurement for deciding an RI, a CQI, a PMI and the like included in CSI. The former is mainly performed for cell selection by both a UE in an RRC idle mode and a UE in an RRC connected mode. On the other hand, the latter is performed to recognize an interference situation by a UE in an RRC connected mode.

(3) CQI

Settings related to the reference signal that the UE uses for calculating the CQI is called a CSI-RS configuration. The CSI-RS configuration includes information that indicates the position and the cycle of the CSI-RS (the position of the CSI-RS in a resource block and a cycle of a sub-frame into which the CSI-RS is inserted) that are provided by the serving eNB. The UE can ascertain the position and the cycle of the CSI-RS with reference to the CSI-RS configuration and can perform measurement and reporting using the CSI-RS. In this manner, the UE can receive a desired signal that has been transmitted from the serving eNB by using transmission settings suitable for itself.

For calculating the CQI, information about the received power of an interference signal is also used as well as the received power of the desired signal. Here, the interference signal is a signal that comes from the neighbor eNB. In order for the UE to be able to measure the interference signal, a notification of the information that indicates the position and the cycle of the IMR for measuring the interference signal from the neighbor eNB is provided as an IMR configuration to the UE. The UE can ascertain the position and the cycle of the IMR with reference to the IMR configuration and can measure the interference signal. Then, the UE calculates the CQI by using the results of measuring the desired signal and the interference signal. The IMR typically receives the CSI-RS that comes from the neighbor eNB.

However, one IMR can measure one or more reference signals from one or more neighbor eNBs. That is, it is difficult to identify from which beam from which neighbor eNB the interference comes and how large the interference is, from the measurement result of the IMR. Therefore, the measurement result of the IMR is used for measuring the total amount of the interference.

(4) First Estimation Error of Interference Power

In order for the UE to accurately calculate the CQI, it is important to accurately estimate the power of the desired signal (optical signal power) and the power of the interference signal (interference signal power) on the basis of downlink channel information that has been obtained by measuring the CSI-RS. In a case in which these values have errors, the CQI becomes not accurate, a modulation scheme is incorrectly selected on the side of the eNB, and a decrease in a throughput can occur, for example.

The point to be noted here is that the CSI-RS is a reference signal and is not a data signal. That is, a difference in received power can occur between the reference signal and the data signal. Therefore, it is desirable that the UE estimate the received power of the desired data signal (that is, the data signal from the serving eNB) and the received power of the interference data signal (that is, the data signal from the neighbor eNB) and calculate the CQI on the basis of the estimation result. Thus, the UE can estimate the received power of the desired data signal on the basis of the result of measuring the CSI-RS from the serving eNB. In addition, the UE can estimate the received power of the interference data signal by measuring the signal (typically, the CSI-RS) form the neighbor eNB with the IMR.

However, the result of estimating the received power of the desired data signal and the interference data signal can include errors.

One of causes of the error included in the estimated received power of the desired data signal is that there is a difference between the received power of the CSI-RS from the serving eNB and the received power of the physical downlink shared channel (PDSCH). According to the 3GPP standard (3GPP TS 36.213), a parameter Pc is provided in the CSI-RS configuration in order for the UE to be able to estimate the received power of the desired data signal in consideration of the difference. The parameter Pc is an estimated ratio of energy per resource element (EPRE) of the PDSCH with respect to EPRE of the CSI-RS. The UE can ascertain the power difference between the CSI-RS from the serving eNB and the PDSCH by acquiring the parameter Pc from the CSI-RS configuration and can more accurately correct the received power of the desired data signal. Hereinafter, an example of a flow of CQI calculation processing in the LTE in the related art will be described with reference to FIG. 5.

Figure 5:
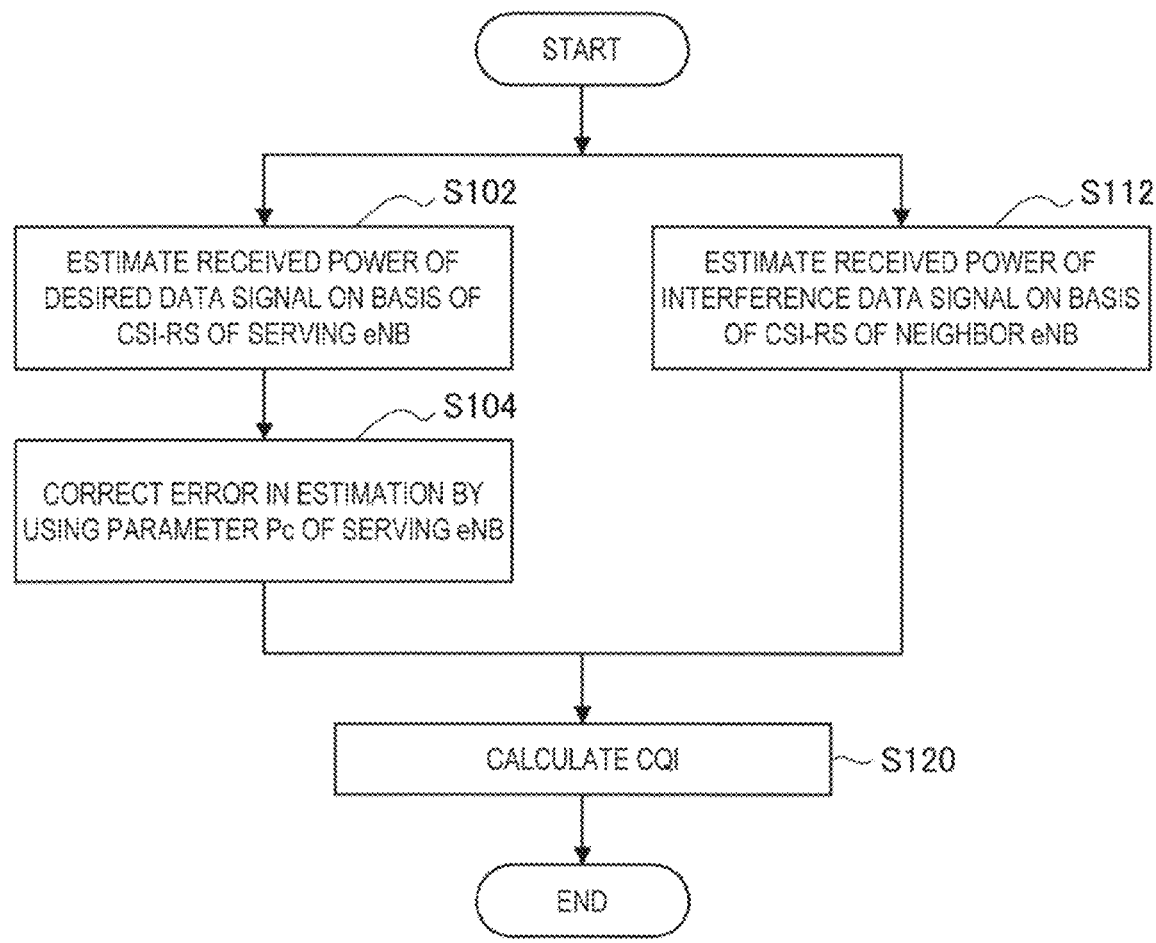
FIG. 5 is a flowchart illustrating an example of a flow of CQI calculation processing executed by UE of LTE in the related art.

FIG. 5 is a flowchart illustrating an example of a flow of CQI calculation processing executed by the UE of the LTE in the related art. As illustrated in FIG. 5, the UE estimates the received power of the desired data signal on the basis of the CSI-RS of the serving eNB (Step S102). Then, the UE corrects the error in the estimated received power by using Pc of the serving eNB (Step S104). Meanwhile, the UE estimates the received power of the interference data signal on the basis of the CSI-RS of the neighbor eNB (Step S112). Then, the UE calculates the CQI on the basis of these estimation results (Step S120).

Here, the difference between the received power of the CSI-RS from the neighbor eNB and the received power of the PDSCH is exemplified as one of the causes of the error in the estimated received power of the interference data signal in a similar manner to the desired data signal. However, it is difficult for the UE to reduce the error in the estimated received power of the interference data signal since a notification of the parameter Pc of the neighbor eNB is not provided.

Thus, a technique of providing Pc of the neighbor eNB to the UE will be provided in the first embodiment.

(5) Second Error in Estimated Interference Power

The method of estimating the received power of the interference data signal on the basis of the CSI-RS from the neighbor eNB has been described above on the assumption that the data signal is transmitted from the neighbor eNB. However, there is also a case in which no data signal is transmitted, and a large error in the estimation occurs since the interference power estimated on the basis of the CSI-RS does not actually come in such a case. In the large-scale MIMO system in which an antenna gain is larger than that of the LTE in the related art, whether or not the data signal is transmitted (that is, whether the PDSCH is used or not used) greatly affects the error in the estimated interference power.

Thus, a technique capable of reducing the error in the estimation that is caused depending on whether the PDSCH is used or not used by exchanging information related to transmission schedules of the PDSCH between eNBs will be provided in the second embodiment.

2. CONFIGURATION EXAMPLE

2.1. Schematic Configuration Example of System

Figure 6:
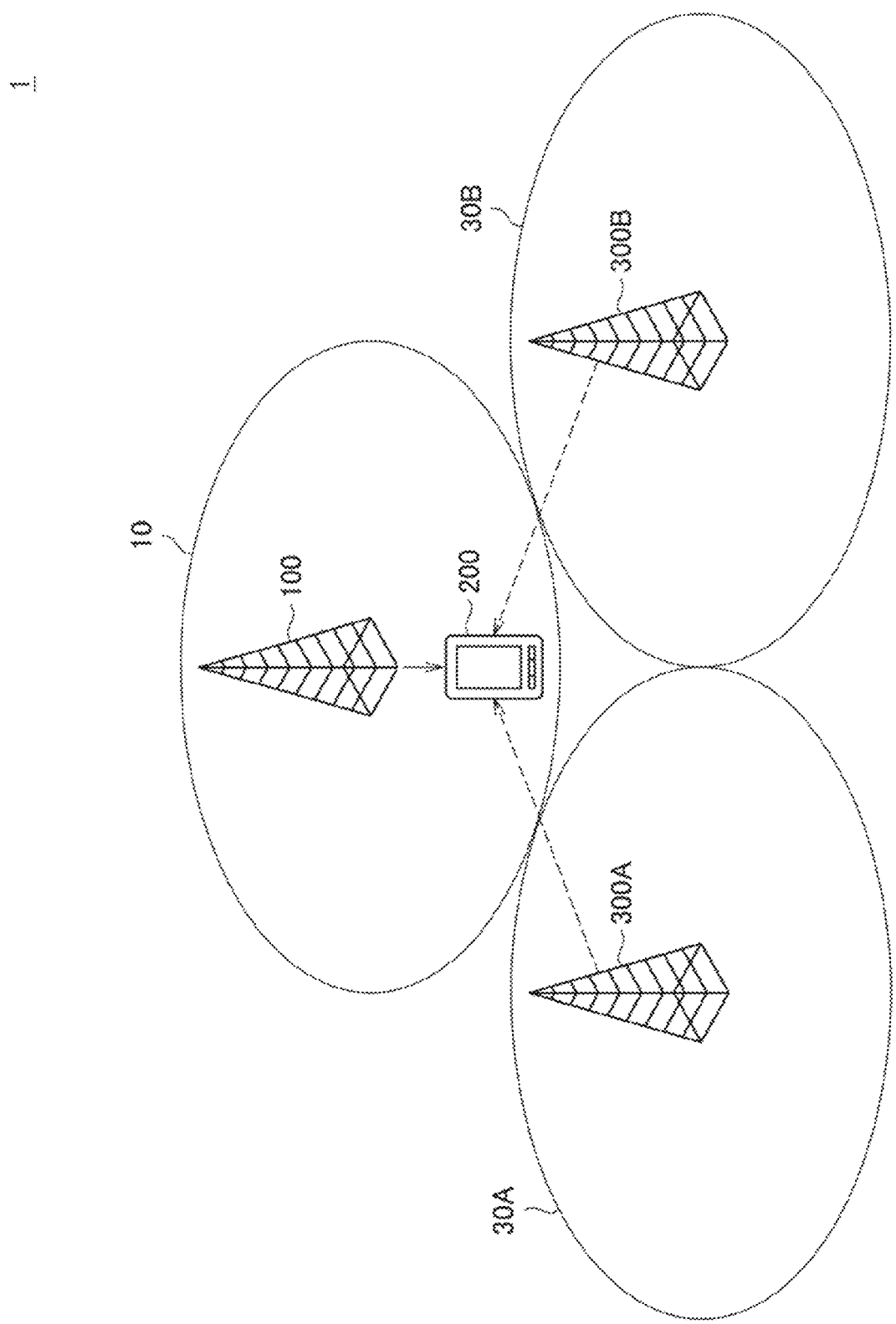
FIG. 6 is a diagram for describing an example of a schematic configuration of a system according to an embodiment of the present disclosure.

Next, a schematic configuration of a communication system 1 according to an embodiment of the present disclosure will be described with reference to FIG. 6. FIG. 6 is a diagram for describing an example of the schematic configuration of the communication system 1 according to an embodiment of the present disclosure. Referring to FIG. 6, the system 1 includes a base station 100, a terminal apparatus 200, and a neighbor base station 300. The system 1 is a system which complies with, for example, LTE, LTE-Advanced, or similar communication standards.

(Base Station 100)

The base station 100 performs wireless communication with the terminal apparatuses 200. For example, the base station 100 performs wireless communication with the terminal apparatuses 200 located in a cell 10 of the base station 100.

Particularly, in the embodiment, the base station 100 performs beamforming. For example, the beamforming is beamforming of large-scale MIMO. The beamforming may also be referred to as beamforming of massive MIMO, beamforming of free dimension MIMO or three-dimensional beamforming. Specifically, for example, the base station 100 includes a directional antenna usable for large-scale MIMO and performs beamforming of large-scale MIMO by multiplying a transmission signal by a weight set for the directional antenna.

Further, the base station 100 can transmit the reference signal for channel quality measurement by a directional beam, in particular, in the embodiment. It is a matter of course that the base station 100 may transmit the reference signal without using the directional beam. For example, the reference signal is the CSI-RS. In addition, the base station 100 can transmit the data signal by a directional beam. It is a matter of course that the base station 100 may transmit the data signal without using the directional beam. For example, the data signal is the PDSCH.

(Terminal Apparatus 200)

The terminal apparatus 200 performs wireless communication with a base station. For example, the terminal apparatus 200 performs wireless communication with the base station 100 when located within a cell 10 of the base station 100. For example, the terminal apparatus 200 performs wireless communication with a neighbor base station 300 when located within a cell 30 of the neighbor base station 300.

(Neighbor Base Station 300)

The neighbor base station 300 is a neighbor base station of the base station 100. For example, the neighbor base station 300 has a similar configuration to that of the base station 100 and performs similar operations to those of the base station 100. Although FIG. 6 illustrates two neighbor base stations 300, it is a matter of course that a single base station 300 may be included in the system 1, or three or more base stations 300 may be included in the system 1.

In the embodiment, the terminal apparatus 200 is assumed to be connected to the base station 100. That is, the base station 100 is a serving base station of the terminal apparatus 200, and the cell 10 is a serving cell of the terminal apparatus 200. The solid line arrow in the drawing represents the desired signal transmitted to the terminal apparatus 200, and the broken line arrow represents the interference signal.

Note that both the base station 100 and the neighbor base station 300 may be base stations of macro cells. Alternatively, both the base station 100 and the neighbor base station 300 may be base stations of small cells. Alternatively, one of the base station 100 and the neighbor base station 300 may be a base station of a macro cell and the other of the base station 100 and the neighbor base station 300 may be a base station of a small cell.

2.2. Configuration Example of Base Station

Figure 7:
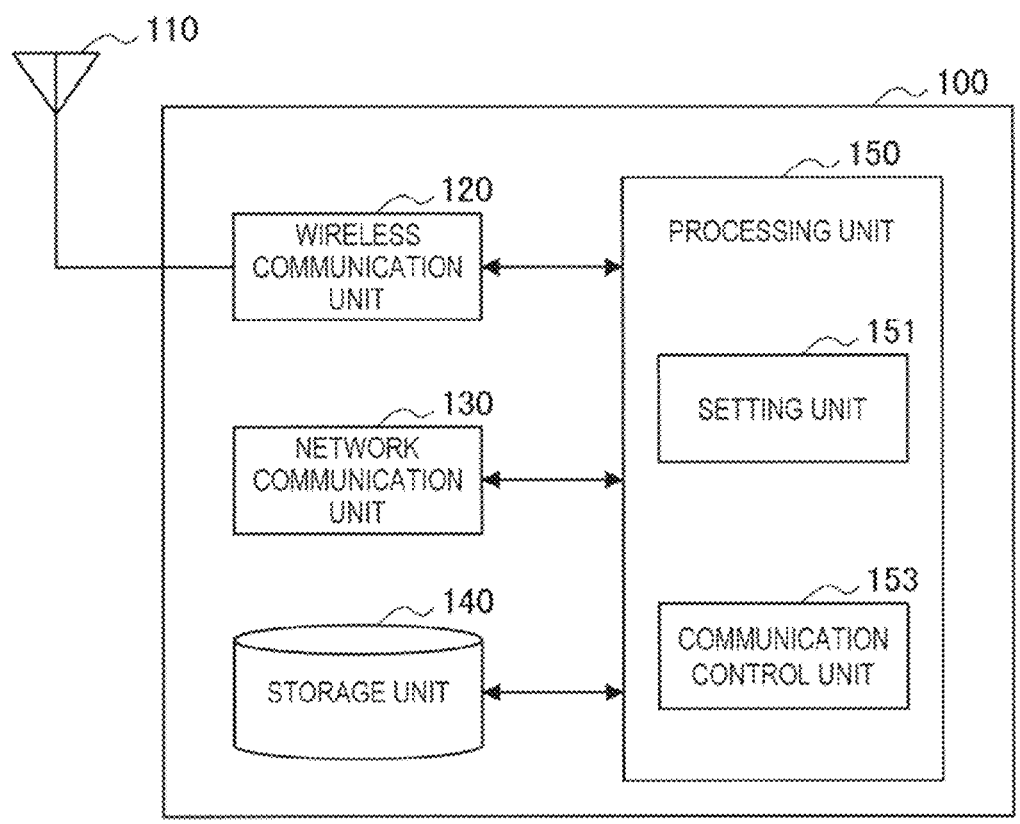
FIG. 7 is a block diagram illustrating an example of a configuration of a base station according to the present embodiment.

Next, an example of the configuration of the base station 100 according to an embodiment of the present disclosure will be described with reference to FIG. 7. FIG. 7 is a block diagram showing an example of the configuration of the base station 100 according to the embodiment of the present disclosure. Referring to FIG. 7, the base station 100 includes an antenna unit 110, a wireless communication unit 120, a network communication unit 130, a storage unit 140, and a processing unit 150.

(Antenna Unit 110)

The antenna unit 110 radiates a signal output by the wireless communication unit 120, in the form of radio waves, into space. In addition, the antenna unit 110 also converts radio waves in space into a signal, and outputs the signal to the wireless communication unit 120.

For example, the antenna unit 110 includes a directional antenna. For example, the directional antenna is a directional antenna which can be used in large-scale MIMO.

(Wireless Communication Unit 120)

The wireless communication unit 120 transmits and receives signals. For example, the wireless communication unit 120 transmits a downlink signal to the terminal apparatus 200 and receives an uplink signal from the terminal apparatus 200.

(Network Communication Unit 130)

The network communication unit 130 transmits and receives information. For example, the network communication unit 130 transmits information to other nodes and receives information from other nodes. For example, the other nodes include other base stations (for example, neighbor base station 300) and a core network node.

(Storage Unit 140)

The storage unit 140 stores programs and data for operation of the base station 100.

(Processing Unit 150)

The processing unit 150 provides various functions of the base station 100. The processing unit 150 includes a setting unit 151 and a communication control unit 153. Note that the processing unit 150 may further include other components in addition to such components. That is, the processing unit 150 may perform operations other than operations of such components.

Specific operations of the setting unit 151 and the communication control unit 153 will be described below in detail.

2.3. Configuration of Terminal Apparatus

Figure 8:
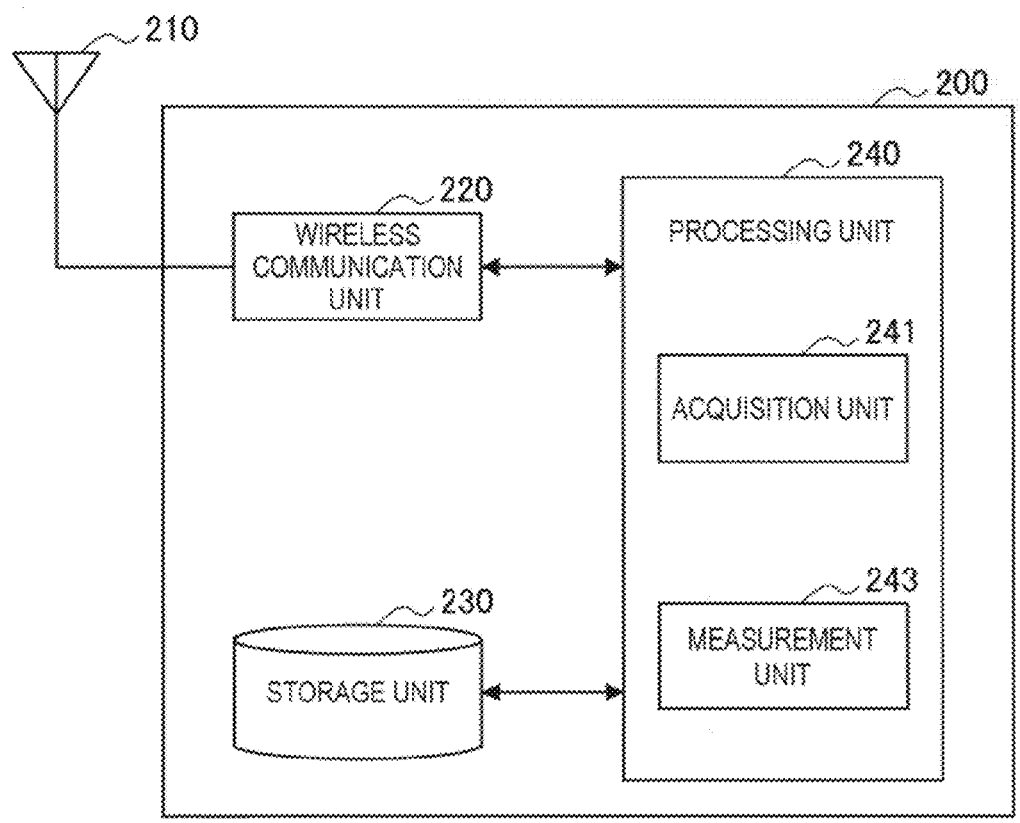
FIG. 8 is a block diagram illustrating an example of a configuration of a terminal apparatus according to the present embodiment.

Next, an example of the configuration of the terminal apparatus 200 according to an embodiment of the present disclosure will be described with reference to FIG. 8. FIG. 8 is a block diagram for showing an example of the configuration of the terminal apparatus 200 according to the embodiment of the present disclosure. Referring to FIG. 8, the terminal apparatus 200 includes an antenna unit 210, a wireless communication unit 220, a storage unit 230 and a processing unit 240.

(Antenna Unit 210)

The antenna unit 210 radiates a signal output by the wireless communication unit 220, in the form of radio waves, into space. In addition, the antenna unit 210 also converts radio waves in space into a signal, and outputs the signal to the wireless communication unit 220.

(Wireless Communication Unit 220)

The wireless communication unit 220 transmits and receives signals. For example, the wireless communication unit 220 receives a downlink signal from the base station 100 and transmits an uplink signal to the base station 100.

(Storage Unit 230)

The storage unit 230 stores a program and data for operation of the terminal apparatus 200.

(Processing Unit 240)

The processing unit 240 provides a variety of functions of the terminal apparatus 200. The processing unit 240 includes an acquisition unit 241 and a measurement unit 243. Note that the processing unit 240 can further include components other than these components. That is, the processing unit 240 can perform operations other than the operations of these components.

Specific operations of the acquisition unit 241 and the measurement unit 243 will be described later in detail.

3. FIRST EMBODIMENT

Hereinafter, a first embodiment will be described with reference to FIGS. 9 to 12.

3.1. Technical Problems (1) First Problem

A technical problem of the embodiment is the error in the estimated received power of the interference data signal that is caused by the difference in the received power of the reference signal and the data signal as described above. Therefore, a technology of providing a notification of a Pc of the neighbor base station 300 to the terminal apparatus 200 will be provided first in the embodiment.

(2) Second problem

However, there is also a case in which it is difficult to reduce the error in the estimated received power of the interference data signal even if it becomes possible for the terminal apparatus 200 to acquire the parameter Pc of the neighbor base station 300. This is because the parameter Pc can be received in a state in which CSI-RSs are present together in a single IMR since the parameter Pc can be applied to the received power of the CSI-RSs corresponding to the parameter Pc.

In the LTE in the related art, such an error in the estimated received power of the interference data signal that is caused by such a problem is not particularly considered as a problem. This is because the number of antenna elements mounted on the eNB is small and the environment of the interference power does not greatly vary.

Meanwhile, since the environment of the interference power can greatly vary in the large-scale MIMO, the error in the estimated received power of the interference data signal can become a severe problem.

Specifically, a CSI-RS with beamforming and a CSI-RS with no beamforming are considered first in the large-scale MIMO. There are cases in which the PDSCH is subjected to the beamforming for each eNB in both schemes. In addition, the number of beams that are multiplexed at the same time changes in some cases, and in such cases, the power of each beam changes. In addition, a case in which an excessively large antenna gain is not used in order to avoid interference with the neighbor cell is also assumed. As described above, the degree of freedom of the antenna gain obtained by the beamforming can become larger in the environment of the large-scale MIMO as compared with the previous one.

Therefore, it is possible to state that there is a high likelihood that the degree of freedom in setting the parameter Pc for each CSI-RS configuration will be significantly greater than that in the previous one (specifically, 1 dB steps from −8 dB to 15 dB). In a case in which the degree of freedom in setting a Pc is significantly large, it is difficult to reduce the error in the estimation by using a plurality of Pcs that are set with a high degree of freedom in the settings related to results of measuring a plurality of CSI-RSs from a single neighbor eNB with a single IMR. Similar difficulty also occurs in a case in which a plurality of CSI-RSs from a plurality of neighbor eNBs are present together in a single IMR.

A method of restricting the degree of freedom in setting a Pc may be considered as an example of methods for solving this problem. In a case in which the degree of freedom in setting a Pc is restricted, it is considered to be possible to reduce the error in the estimated received power of the interference data signal on the basis of the result of measuring the IMR. However, if the degree of freedom in setting a Pc is restricted, there is a possibility that interference due to unnecessary radiation may occur or the number of UEs that can perform MU-MIMO by using spatial multiplexing will be restricted.

Setting an IMR for each CSI-RS may be exemplified as another example of the methods for solving the problem. However, overheads of the IMR that occupies the wireless resource becomes excessively large in the method. In an environment in which small base stations are densely arranged, for example, it is assumed that a large number of neighbor base stations as interference sources are present in the neighborhood of the serving base station. In addition, the number of types (directions, for example) of the beams that can be provided by a single base station is significantly large in the case of the large-scale MIMO. Therefore, the number of IMRs that are set for measuring the CSI-RSs with beamforming from the neighbor base stations can become huge in a case in which the CSI-RSs are provided with beamforming.

Thus, a technique of more finely measuring the interference from the neighbor eNB by using a plurality of IMRs in accordance with the setting of a Pc will be further provided in the embodiment.

3.2. Technical Features (1) Estimation Based on Pc of Neighbor Base Station

The base station 100 (for example, the setting unit 151) provides a notification of information related to a power difference between the CSI-RS of the neighbor base station 300 and the PDSC (that is, the information related to the parameter Pc) to the terminal apparatus 200. In this manner, the terminal apparatus 200 (for example, the acquisition unit 241) acquires the information related to the power difference between the CSI-RS of the neighbor base station 300 and the PDSCH (that is, Pc). This station is included in the IMR configuration, for example, and the notification thereof is provided from the base station 100 to the terminal apparatus 200. That is, the IMR configuration includes the information related to a Pc in addition to the information that indicates the position and the cycle of the IMR.

The terminal apparatus 200 (for example, the measurement unit 243) measures the CSI-RSs received from the base station 100 and the neighbor base stations 300. Then, the terminal apparatus 200 (for example, the measurement unit 243) calculates the CQI of the neighbor base station 300 on the basis of the results of measuring the CSI-RSs and the IMR configuration and feeds back the CQI to the base station 100. Here, the terminal apparatus 200 (measurement unit 243) estimates the received power of the interference data signal on the basis of the IMR configuration and then calculates the CQI. Since the CQI based on the received power of the interference data signal with a reduced error in the estimation is fed back, the base station 100 (for example, the communication control unit 153) can select an appropriate modulation scheme, for example.

(2) Grouping of Interference Signals

Figure 9:
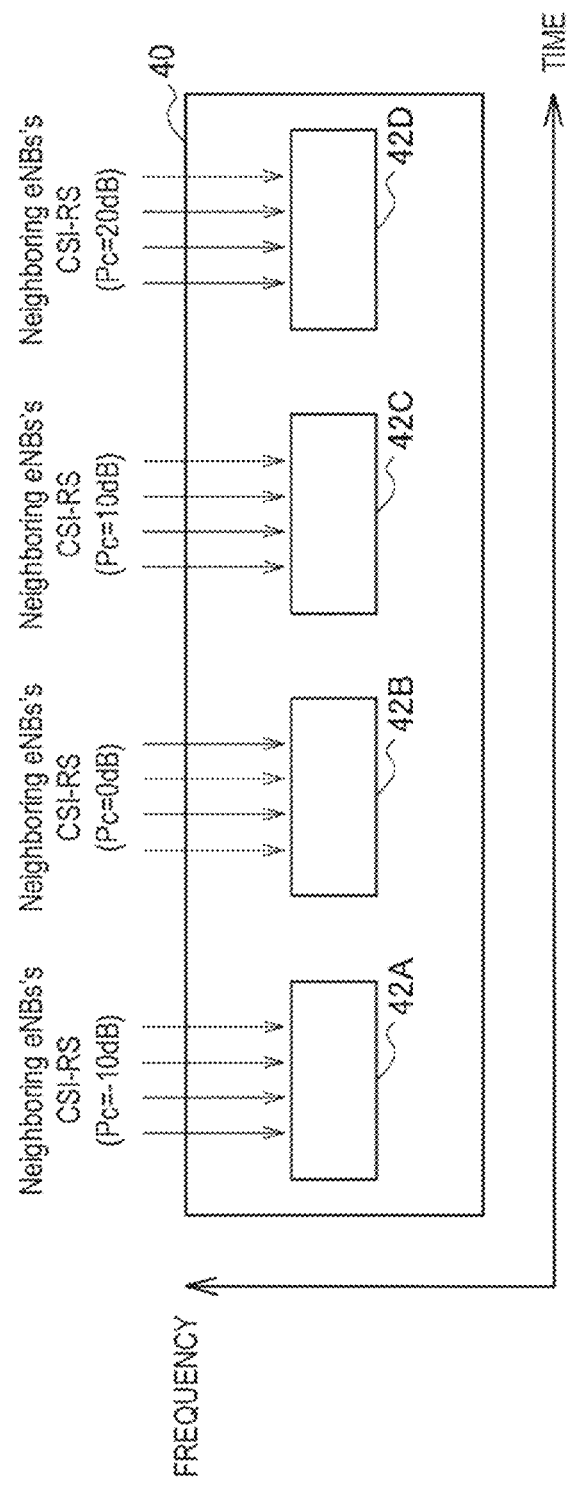
FIG. 9 is an explanatory diagram for explaining technical features of a first embodiment.

In the embodiment, reference signals (the CSI-RSs of neighbor base stations 300) are grouped in accordance with Pc. Then, the reference signals are received by an IMR corresponding to a group (that is, corresponding to Pc of the reference signals). Referring to FIG. 9, specific description will be given of this point.

As illustrated in FIG. 9, a plurality of IMRs 42 are set for a wireless resource (typically, a resource block) 40. Pc is set for each IMR 42, and a CSI-RS with the set Pc arrives the IMR 42. For example, a CSI-RS with Pc of −10 dB is received by the IMR 42A. A CSI-RS with Pc of 0 dB is received by the IMR 42B. A CSI-RS with Pc of 10 dB is received by the IMR 42C. A CSI-RS with Pc of 20 dB is received by the IMR 42D.

The terminal apparatus 200 (for example, the measurement unit 243) estimates the received power of the interference data signal on the basis of the received power that is measured by each IMR 42. It is a matter of course that one or more CSI-RSs can be present and received together by each IMR 42. In that case, it is difficult to estimate the received power of the interference data signals corresponding to the individual CSI-RSs. Therefore, the received power that is estimated by the terminal apparatus 200 is an approximate value of the received power with large interference among the interference data signals.

The IMR configuration, the notification of which is provided from the base station 100 to the terminal apparatus 200, includes the information that indicates Pc corresponding to each IMR. In this manner, the terminal apparatus 200 can ascertain the CSI-RS with which Pc is to arrive which IMR and can estimate the approximate values of the received power of the interference data signals.

The base station 100 (for example, the setting unit 151) sets the position of the IMR and also sets Pc corresponding to the IMR. Note that the setting can be performed on the basis of an instruction from an operator who uses an operation and maintenance (O & M) interface.

It is desirable that the information related to the position of the IMR and corresponding Pc be shared between the base station 100 and the neighbor base station 300 in order to cause the CSI-RS with corresponding Pc to arrive the IMR. Hereinafter, an example of a sharing method will be described. Note that the information related to the IMR, which is exchanged between the base station 100 and the neighbor base station 300, is also referred to as IMR assignment information below.

First Example

A first example is a mode in which the position of the IMR and Pc corresponding to the IMR of each base station are decided by the operator, and notifications thereof is provided to each base station. According to the example, the neighbor base stations 300 can transmit the CSI-RS so as to be received by the IMR with corresponding Pc from among the IMRs of the base station 100 since the position of the IMR of the base station 100 and Pc are ascertained by the neighbor base station 300. In this manner, the CSI-RSs of the neighbor base stations 300 can be received by the IMRs corresponding to Pc of the CSI-RSs.

In this example, it is not necessary to exchange the information between the base station 100 and the neighbor base station 300.

Second Example

A second example is a mode in which a rule related to the position of the IMR of each base station and Pc (hereinafter, referred to as a grouping rule) is decided by the operator, and each base station decides the position of the IMR and Pc corresponding to the IMR. For example, the grouping rule can include information that indicates a rough position of IMRs, reference levels of the Pc to be set, the upper limit number of IMRs, and the like.

In this example, the base station 100 provides a notification of the IMR assignment information to the neighbor base stations 300. The IMR assignment information includes information that indicates the positions of the IMR. In addition, the IMR assignment information includes information that indicates Pc corresponding to each IMR in the base station 100. The neighbor base station 300 transmits the CSI-RS so as to be received by the IMR with corresponding Pc among the IMRs of the base station 100 on the basis of the IMR assignment information. In this manner, the CSI-RSs of the neighbor base stations 300 can be received by the IMRs corresponding to the Pc of the CSI-RSs. Note that the notification of the information that is common to the base station 100 and the neighbor base station 300 in the IMR assignment information may be omitted. In a case in which the positions, and the numbers of the IMRs, setting of corresponding Pc, and the like are common to the base station 100 and the neighbor base stations 300, for example, the notification itself of the IMR assignment information may be omitted.

Third Example

A third example is similar to the second example in that the grouping rule is decided by the operator. As a different point, this example is a mode in which the base station 100 decides the position of the IMR and Pc corresponding to the IMR on the basis of the information about the CSI-RS that is transmitted from the neighbor base station 300.

In this example, the neighbor base station 300 provides the notification of the IMR assignment information to the base station 100. The IMR assignment information includes information that indicates a schedule (a frequency, a time, a beam, and the like) in which the CSI-RS is transmitted. In addition, the IMR assignment information includes the information that indicates the Pc corresponding to the CSI-RS. The base station 100 (for example, the setting unit 151) sets the IMR and sets the Pc on the basis of the acquired IMR assignment information. In this manner, the CSI-RS of the neighbor base station 300 can be received by the IMR corresponding to the Pc of the CSI-RS. Note that the notification of the information that is common to the base station 100 and the neighbor base station 300 in the IMR assignment information may be omitted.

Flow of Processing

Hereinafter, examples of flows of processing calculating the CQI by the terminal apparatus 200 according to the embodiment and processing of the entire system 1 will be described with reference to FIGS. 10 and 11.

Figure 10:
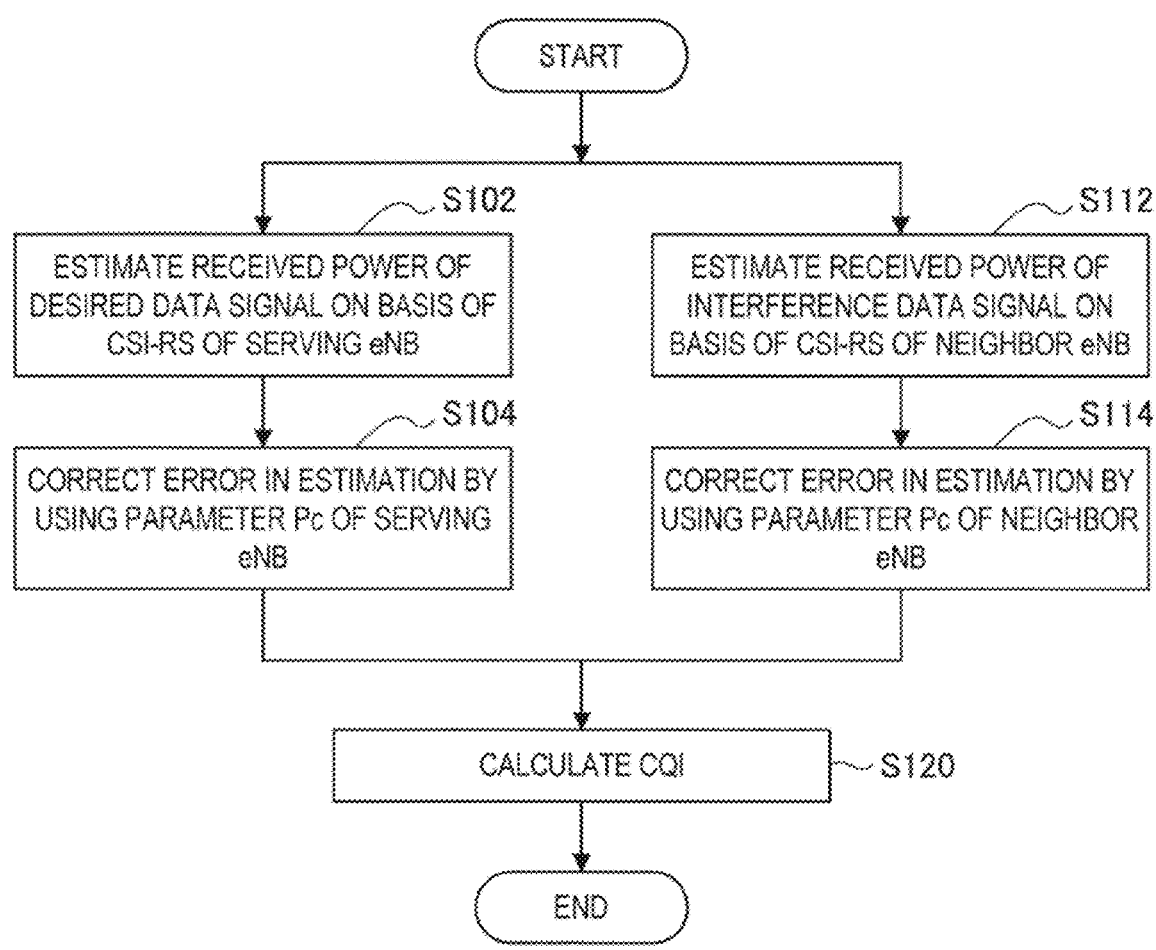
FIG. 10 is an explanatory diagram for explaining technical features of the embodiment.

FIG. 10 is a flowchart illustrating an example of a flow of processing calculating the CQI that is executed by the terminal apparatus 200 according to the embodiment. As illustrated in FIG. 10, the terminal apparatus 200 (for example, the measurement unit 243) estimates received power of a desired data signal on the basis of the CSI-RS of the base station 100 (Step S102). Then, the terminal apparatus 200 (for example, the measurement unit 243) corrects an error in estimated received power by using Pc of the base station 100 (Step S104). Meanwhile, the terminal apparatus 200 (for example, the measurement unit 243) estimates received power of the interference data signal on the basis of the CSI-RS of the neighbor base station 300 (Step S112). Next, the terminal apparatus 200 (for example, the measurement unit 243) corrects the received power by using the Pc of the neighbor base station 300 (Step S114). Then, the terminal apparatus 200 (for example, the measurement unit 243) calculates the CQI on the basis of these estimation results (Step S120).

Figure 11:
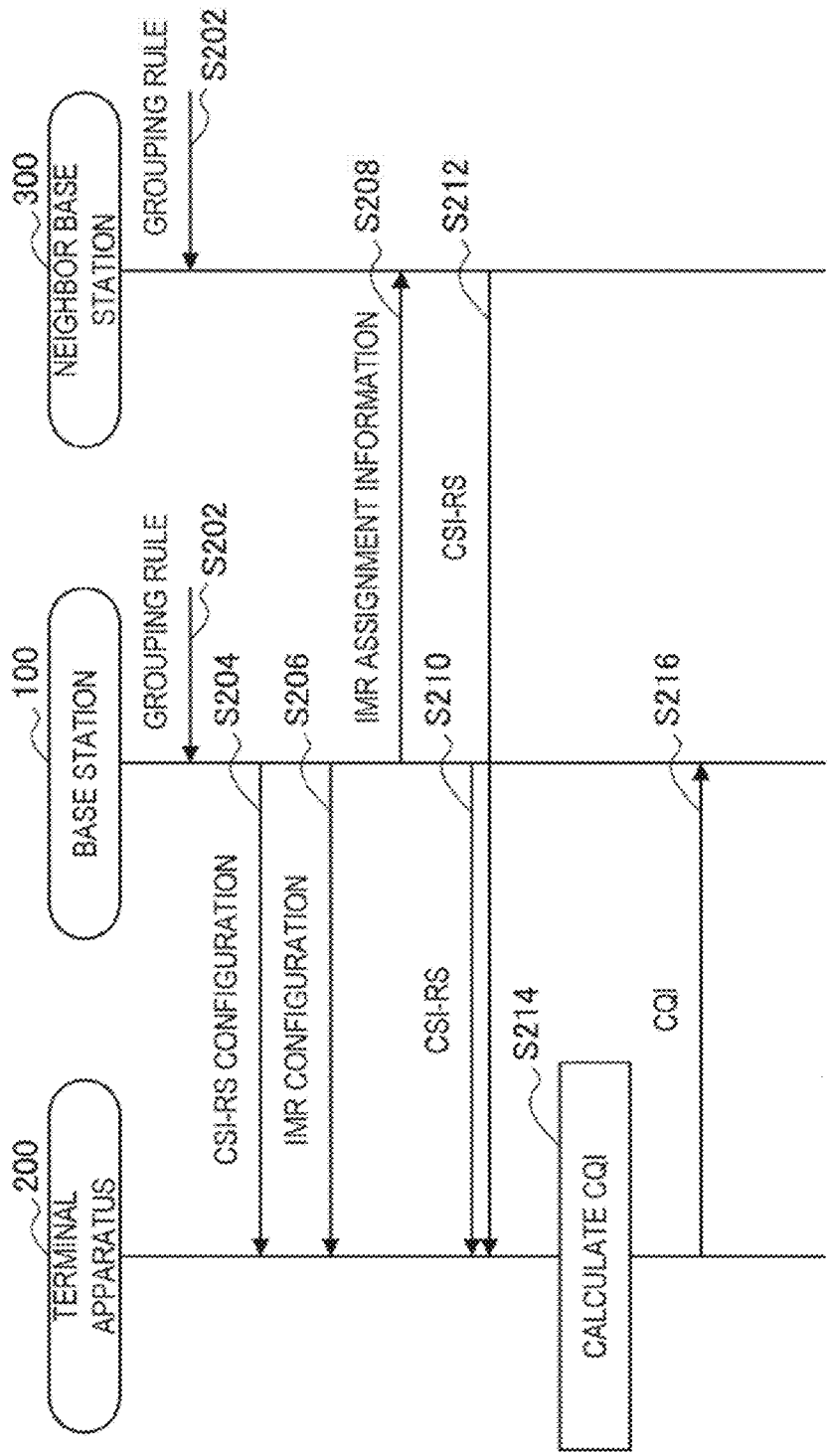
FIG. 11 is an explanatory diagram for explaining technical features of the embodiment.

FIG. 11 is a sequence diagram illustrating an example of a flow of measurement report processing that is executed in the system 1 according to the embodiment. This sequence is a sequence related to the aforementioned second example. As illustrated in FIG. 11, the base station 100 and the neighbor base station 300 acquires the grouping rule from the operator first (Step S202). The grouping rule includes, for example, a reference of a level of the Pc to be set, the upper limit number of the IMRs, and the like. The base station 100 transmits a CSI-RS configuration to the terminal apparatus 200 (Step S204). In addition, the base station 100 transmits the IMR configuration to the terminal apparatus 200 (Step S206). Note that the IMR configuration may be transmitted at the same time as the CSI-RS configuration (while being included in the CSI-RS configuration, for example). Next, the base station 100 provides the notification of the IMR assignment information to the neighbor base station 300 (Step S208). Next, the base station 100 transmits the CSI-RS to the terminal apparatus 200 (Step S210). In addition, the neighbor base station 300 transmits the CSI-RS to the terminal apparatus 200 so as to arrive the IMR with the corresponding Pc set by the terminal apparatus 200, with reference to the IMR assignment information (Step S212). Then, the terminal apparatus 200 calculates the CQI as described above with reference to FIG. 10 (Step S214) and feeds back the CQI to the base station 100 (Step S216).

(3) Variations

Variations of the technique related to the grouping are considered in a variety of ways. Hereinafter, an example thereof will be described.

For example, CSI-RSs may be grouped for each neighbor base station 300. According to the grouping, the CSI-RSs of the neighbor base station 300 are received by IMRs that are different for each neighbor base station 300. In this manner, the terminal apparatus 200 can measure the magnitude of the interference for each neighbor base station 300 and request suppression of the interference for each neighbor base station 300. In this case, the IMR configuration includes information that indicates the neighbor base station 300 corresponding to each IMR. In addition, the IMR assignment information in the second example described above includes information that indicates the neighbor base station 300 corresponding to each IMR of the base station 100.

For example, the IMR configuration may include information that indicates a Pc corresponding to at least a part of IMRs. That is, the information that indicates the PC corresponding to a part of IMRs may be omitted. For an IMR with a Pc of 0 dB or a vicinity value, for example, the information that indicates the Pc may be omitted. This is because the error in the estimation is small in the first place. This omission enables reduction of the amount of communication for providing the notification of the IMR configuration.

For example, the base station 100 (for example, the setting unit 151) may control whether or not to provide the notification of the information that indicates the Pc corresponding to each IMR to the terminal apparatus 200 for each terminal apparatus 200. The desired signal is more dominant than the interference signal in relation to the terminal apparatus 200 that is located near the base station 100, for example. Therefore, since whether or not to correct the error in the estimation by using the Pc has less influences on the SINR and the CQI, the notification and the correction of the error in the estimation may be omitted. Specifically, the base station 100 (for example, the setting unit 151) may omit the notification in a case in which the sum of the entire interference power measured in all the IMRs set for the terminal apparatus 200 is equal to or less than a threshold value (about −110 dB, for example). In this case, the information that indicates the sum of the interference power is fed back from the terminal apparatus 200 to the base station 100. The information that indicates the sum of the interference power may be an index of 10 if the interference power is −100 dBm or an index of 9 if the interference power is −90 dBm, for example. Hereinafter, an example of a flow of the processing will be described with reference to FIG. 12.

Figure 12:
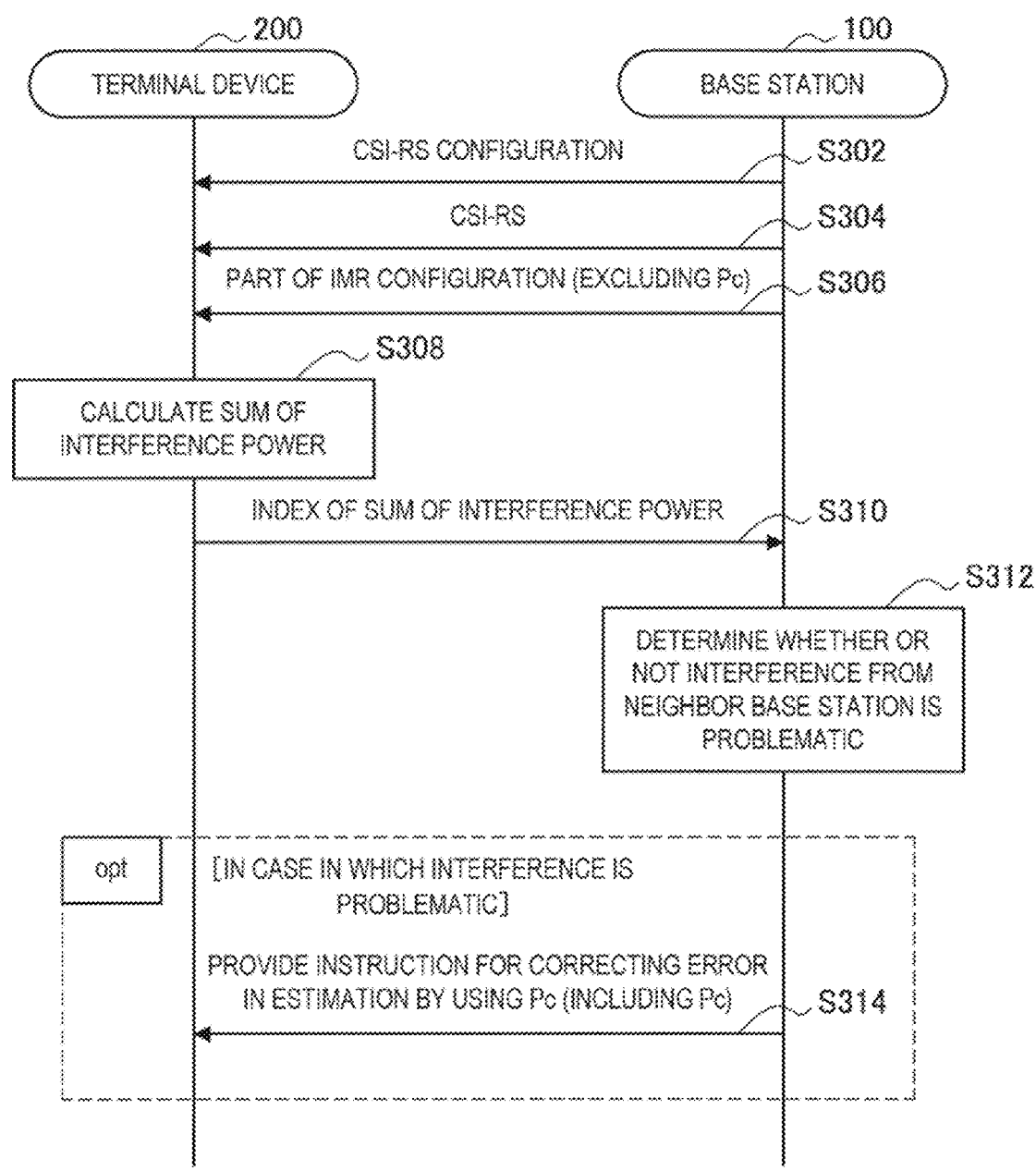
FIG. 12 is an explanatory diagram for explaining technical features of the embodiment.

FIG. 12 is a sequence diagram illustrating an example of a flow of processing of determining whether or not to provide a notification of the information that indicates a Pc corresponding to each IMR that is executed in the system 1 according to the embodiment. As illustrated in FIG. 12, the base station 100 transmits the CSI-RS configuration to the terminal apparatus 200 (Step S302) and transmits the CSI-RS to the terminal apparatus 200 (Step S304). Next, the base station 100 transmits a part of the IMR configuration (the information that indicates a Pc corresponding to the IMR is excluded; for example, the information that indicates the position and the cycle of the IMR is included) to the terminal apparatus 200 (Step S306). Next, the terminal apparatus 200 calculates the sum of the interference power (Step S308) and transmits an index of the sum of the interference power to the base station 100 (Step S310). Then, the base station 100 determines whether or not the interference from the neighbor base station 300 is problematic, on the basis of whether or not the sum of the interference power indicated by the index is equal to or less than the threshold value, for example (Step S312). In a case in which it is determined that the interference is problematic (in a case in which the sum exceeds the threshold value, for example), the base station 100 provides a notification of a message of an instruction for correcting the error in the estimation by using the Pc to the terminal apparatus 200 (Step S314). This message includes the information that indicates the Pc corresponding to the IMR. Meanwhile, in a case in which it is determined that the interference is not problematic (in a case in which the sum is equal to or less than the threshold value, for example), the base station 100 omits the notification of the message of the instruction for correcting the erroring the estimation by using the Pc.

Note that these variations may be appropriately combined. For example, the CSI-RSs may be grouped for each neighbor base station 300 for the neighbor base stations 300 near the terminal apparatus 200, and the correction of the error in the estimation may be omitted for the neighbor base stations 300 far from the terminal apparatus 200.

4. SECOND EMBODIMENT

Next, a second embodiment will be described with reference to FIGS. 13 to 16.

4.1. Technical Problems

Whether or not the PDSCH is actually used greatly affects the amount of interference. In the first embodiment, the received power of the interference data signal is estimated on the assumption that the data signal is transmitted from the neighbor base station 300. Therefore, a large error in the estimation can occur in the estimation method according to the first embodiment in a case in which the data signal is not transmitted from the neighbor base station 300.

Here, if the schedule information related to the frequency, the time, the beam, and the like of the PDSCH transmitted from the neighbor base station 300 is ascertained, it is considered to be possible to correct this error in the estimation. However, since the downlink assignment corresponding to the schedule information in the LTE in the related art has a large amount of information and instantaneously provides a notification of the most recent schedule to the terminal apparatus under control, the downlink assignment is not suitable for the purpose of sharing the information with other base stations. In addition, although a method of correcting the estimated value of the interference power on the basis of the schedule information from the neighbor base station 300 on the side of the base station 100 is also considered, overhead of uplink communication for feeding back the estimated value of the interference power is problematic in this method.

4.2. Technical Features (1) Use of Schedule Information

In the embodiment, schedule information that indicates a rough transmission schedule with reduced granularity as compared with that in the related art. More specifically, the schedule information according to the embodiment is information that indicates restriction of a transmission schedule of the data signal in the neighbor base station 300 in a predetermined period of time in the future. The restriction of the transmission schedule in the predetermined period of time in the future can also be stated as prediction of the transmission schedule.

A method of reducing the granularity in a frequency direction is exemplified as the method of reducing the granularity while the UE to be used is scheduled for each resource block that includes twelve sub-carriers and seven OFDM symbols in the LTE in the related art, for example. For example, the schedule information may include information that indicates whether or not each sub-band is used for transmitting the data signal. The sub-band can also be understood as a frequency band that includes a plurality of sub-carriers or a frequency band that is obtained by dividing a component carrier to a plurality of parts. In addition, the schedule information may include information that indicates whether or not each beam is used to transmit the data signal. Note that the information that indicates whether or not the sub-band is used to transmit the data signal can also be understood as information that indicates a sub-band that is used with a high possibility. The same applies to beams.

The base station 100 (for example, the setting unit 151) acquires the schedule information (that is, the aforementioned information that indicates the rough transmission schedule) in the neighbor base station 300. Then, the base station 100 (for example, the setting unit 151) provides a notification of the acquired schedule information to the terminal apparatus 200. The schedule information may be included in the IMR configuration.

Figure 13:
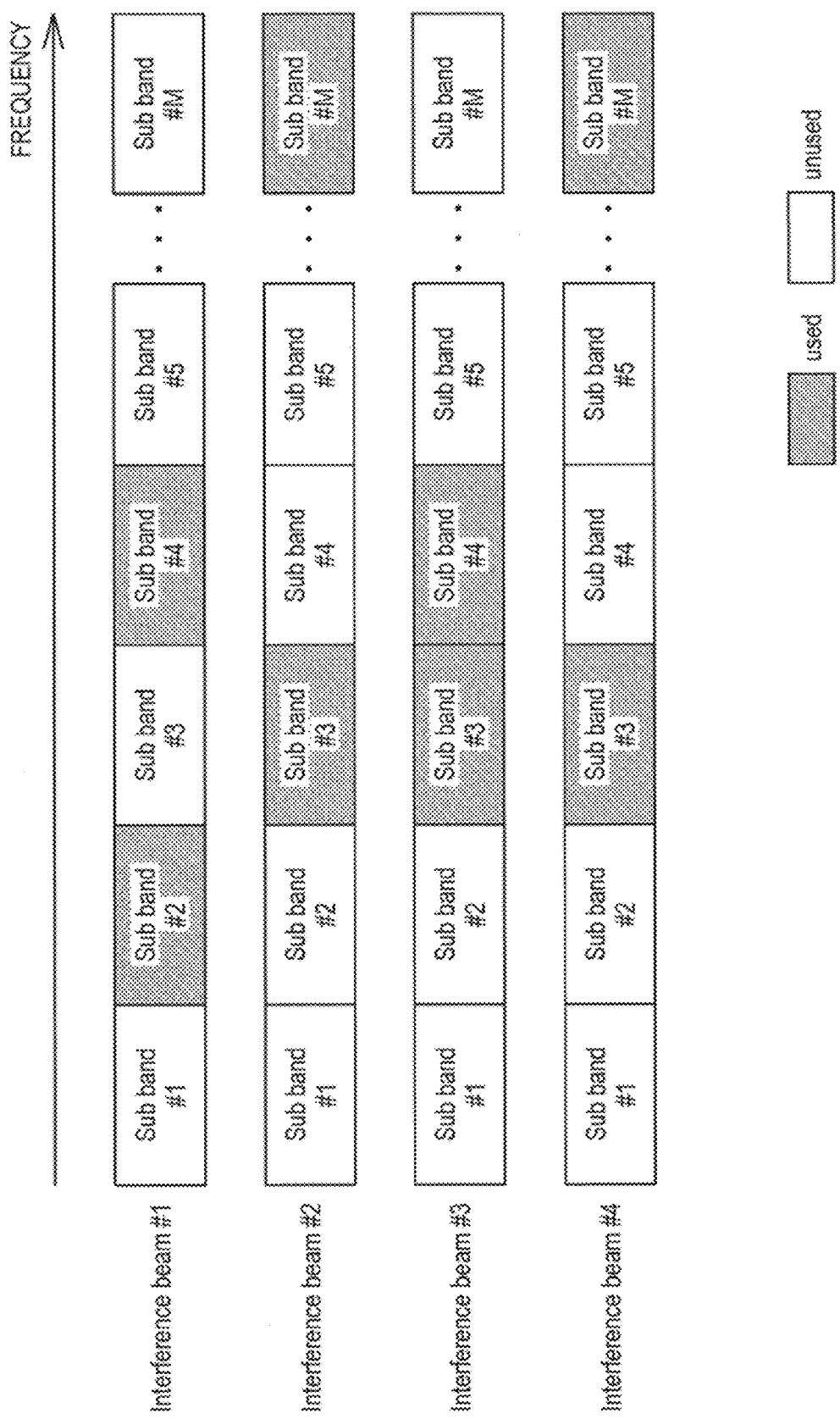
FIG. 13 is an explanatory diagram for explaining technical features of a second embodiment.

The terminal apparatus 200 (for example, the acquisition unit 241) acquires the schedule information from the base station 100. Then, the terminal apparatus 200 (for example, the measurement unit 243) further estimates received power of the interference data signal for each sub-band on the basis of the schedule information. Specifically, the terminal apparatus 200 performs the estimation by the method described in the first embodiment for the sub-band to be used and performs the estimation on the assumption that the received power is zero or a small value for the sub-band that is not used. Then, the terminal apparatus 200 calculates the CQI for each sub-band and feeds back the CQI. An example of the schedule information is illustrated in FIG. 13. As illustrated in FIG. 13, the schedule information includes information that indicates whether or not each interference beam (the PDSCH with beamforming) is used for each sub-band. For example, the terminal apparatus 200 calculates the CQI of the entire bandwidth (for example, the width of 20 MHz) in consideration only of N sub-bands that are used with a high possibility among M sub-bands as the interference power in relation to an interference beam #1. If description is given while focusing on a sub-band #3, the terminal apparatus 200 separately measures interference power of four interference beams (CSI-RS with beamforming) by using four IMRs, then refers to the schedule information for each sub-band, and calculates the CQI in consideration only of the interference power of the interference beams #2, #3, and #4.

Hereinafter, an example of a flow of processing calculating the CQI by the terminal apparatus 200 according to the embodiment will be described with reference to FIG. 14.

Figure 14:
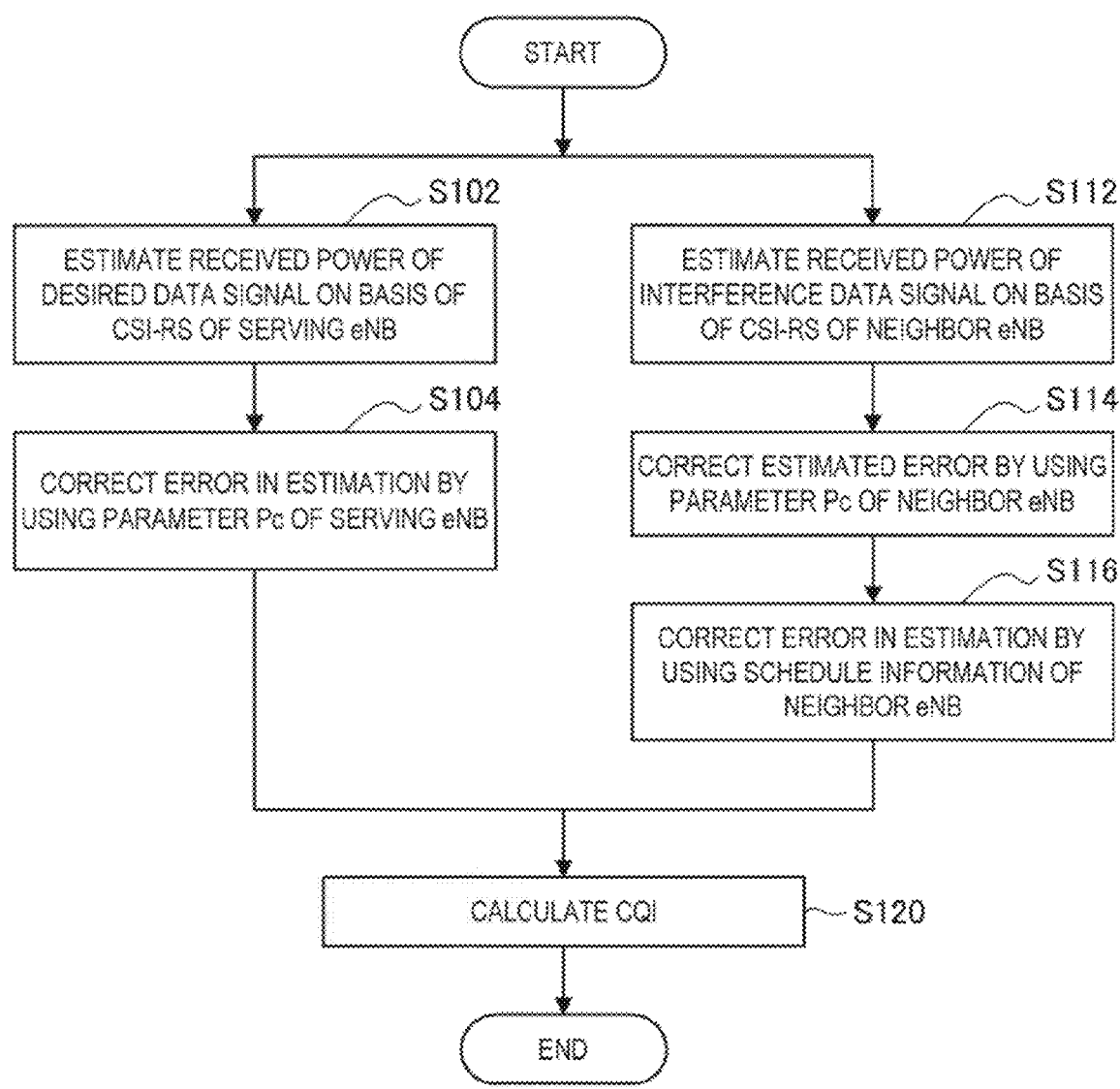
FIG. 14 is an explanatory diagram for explaining technical features of the embodiment.

FIG. 14 is a flowchart illustrating an example of a flow of processing of calculating the CQI1 that is executed in the terminal apparatus 200 according to the embodiment. Processing related to Steps S102 to S114 is as described above with reference to FIG. 10. After Step S114, the terminal apparatus 200 (for example, the measurement unit 243) corrects the error in estimated received power by using the schedule information of the neighbor base station 300 (Step S116). Then, the terminal apparatus 200 (measurement unit 243) calculates the CQI on the basis of these estimation results (Step S120).

(2) Limitation of Sub-Band to Transmit CSI-RS

The LTE is typically run by a component carrier with a bandwidth of 20 MHz, and the CQI is fed back in units of sub-bands obtained by dividing 20 MHz into M parts. Following this procedure, the terminal apparatus 200 (for example, the measurement unit 243) according to the embodiment may calculate and feed back the CQI for each sub-band. The terminal apparatus 200 can also feed back a more accurate CQI for each sub-band in this case by estimating the received power of the interference data signal on the basis of the schedule information.

According to the LTE in the related art, one CSI-RS with beamforming is transmitted by all resource blocks with the bandwidth (for example, 20 MHz). Meanwhile, the neighbor base station 300 may transmit the CSI-RS only with the sub-band that is used with a high possibility for the data signal to any of the terminal apparatuses 200. In this case, the terminal apparatus 200 under the control of the base station 100 can estimate the received power of the interference data signal in consideration only of the sub-band that is used with a high possibility without selecting the sub-band to be considered for estimating the interference power on the basis of the schedule information. In addition, it is possible to reduce the resource for transmitting the CSI-RS and to reduce the IMR set by the base station 100 by limiting the sub-band in which the neighbor base station 300 transmits the CSI-RS to a part of the bandwidth. This is because only a smaller number of IMRs are necessary in the case in which the CSI-RS is transmitted only in a part of the bandwidth than in the case in which the CSI-RS is transmitted in the entire bandwidth.

The base station 100 shares the schedule information with the neighbor base station 300 and provides a notification of the shared schedule information to the terminal apparatus 200. If this is more simply stated, the base station 100 provides a notification of the information that indicates the sub-band that is used with a high possibility, which is shared with the neighbor base station 300, to the terminal apparatus 200. In this manner, the terminal apparatus 200 can reduce processing burden by performing the measurement only in the sub-band of the notification. The terminal apparatus 200 can estimate the received power of the interference data signal in consideration only of the sub-band that is used with a high possibility as described above even in a case in which the notification of the schedule information is not provided to the terminal apparatus 200. This is because the CSR-RS is transmitted only in the sub band that is used with a high possibility from the neighbor base station 300.

Hereinafter, an example of a flow of processing in the entire system 1 according to the embodiment will be described with reference to FIG. 15.

Figure 15:
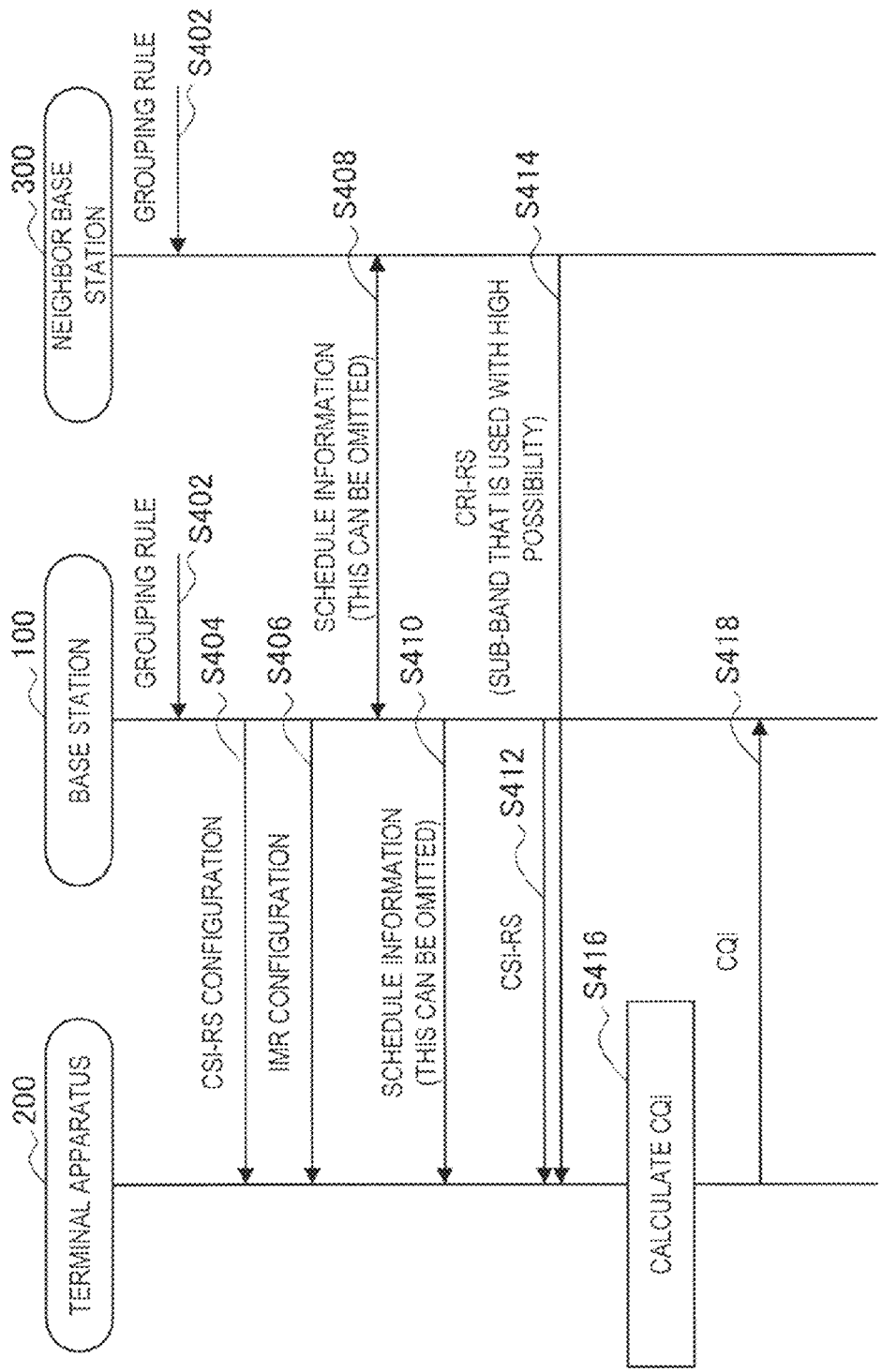
FIG. 15 is an explanatory diagram for explaining technical features of the embodiment.

FIG. 15 is a sequence diagram illustrating an example of a flow of measurement report processing that is executed in the system 1 according to the embodiment. Processing related to Steps S402 to S406 is similar to the processing related to Steps S202 to S206 described above with reference to FIG. 11. Next, the base station 100 and the neighbor base station 300 mutually provide notifications of the schedule information (that is, the information that indicates the sub-band that is used with high possibility) (Step S408). Next, the base station 100 provides a notification of the schedule information to the terminal apparatus 200 (Step S410). These notification of the schedules may be omitted. Next, the base station 100 transmits the CSI-RS to the terminal apparatus 200 (Step S412). In addition, the neighbor base station 300 transmits the CSI-RS to the terminal apparatus 200 in the sub-band that is used with a high possibility with reference to the schedule information (Step S414). Then, the terminal apparatus 200 calculates the CQI as described above with reference to FIG. 14 (Step S416) and feeds back the CQI to the base station 100 (Step S418).

(3) Setting of IMR Corresponding to Schedule Information

CSI-RSs of neighbor base stations 300 may be grouped in accordance with the schedule information. In this manner, the CSI-RS of the neighbor base stations 300 are received by the IMRs of the groups corresponding to the schedule information of the neighbor base stations 300.

Figure 16:
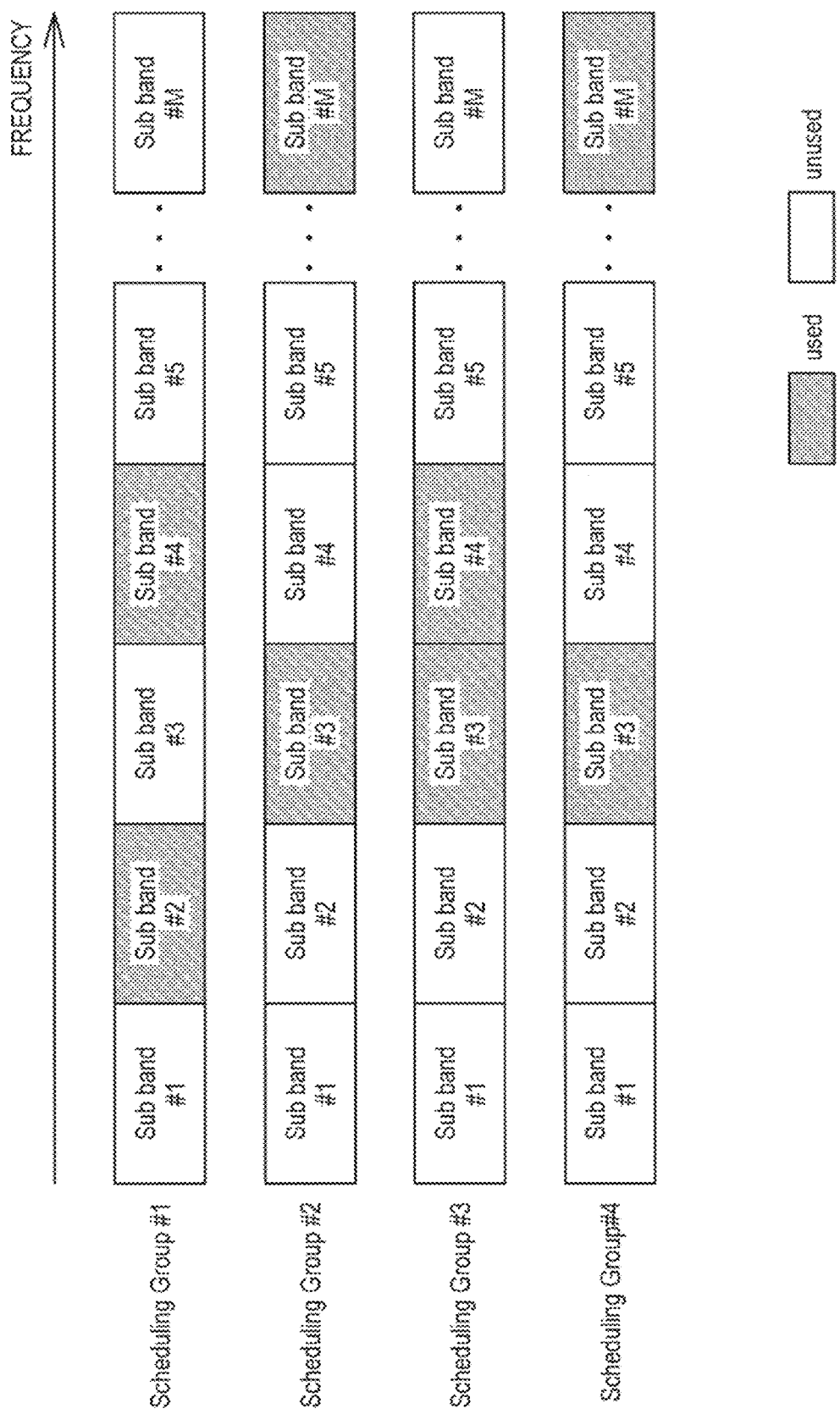
FIG. 16 is an explanatory diagram for explaining technical features of the embodiment.

According to the embodiment, the notification of the schedule information corresponding to each IMR is provided to the terminal apparatus 200. This information may be included in the IMR configuration. The terminal apparatus 200 can ascertain which IMR the CSI-RS under the control of which transmission schedule will arrive, by the information. An example of the schedule information is illustrated in FIG. 16. As illustrated in FIG. 16, the schedule information includes information that indicates whether or not each sub-band is used for each scheduling group (a group of the same or similar schedule information, for example). For example, a scheduling group #1 is a group for which only the sub-bands #2 and #4 are used. In addition, a scheduling group #2 is a group for which only the sub-bands #3 and #M are used. If description will be given while focusing on the sub-band #3, the terminal apparatus 200 separately measures the interference power of the CSI-RSs from the neighbor base stations 300 that belong to the four groups by using four IMRs and the calculates the CQI in consideration only of the interference power of the scheduling groups #2, #3, and #4.

A flow of processing in a case in which IMRs corresponding to the schedule information may be similar to that described above with reference to FIG. 15. In such a case, the notification of the schedule information corresponding to each IMR is provided to the terminal apparatus 200 in Step S410, for example.

5. APPLICATION EXAMPLES

The technique according to the present disclosure is applicable to various products. The base station 100 may also be implemented, for example, as any type of evolved Node B (eNB) such as macro eNBs and small eNBs. Small eNBs may cover smaller cells than the macro cells of pico eNBs, micro eNBs, home (femt) eNBs, or the like. Instead, the base station 100 may be implemented as another type of base station such as Nodes B, base transceiver stations (BTSs), or the like. The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of components of the base station 100 may be realized in a base station apparatus or a module for a base station apparatus.

Further, for example, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. In addition, the terminal apparatus 200 may be implemented as a machine type communication (MTC) for establishing a machine to machine communication (M2M). Furthermore, at least some of components of the terminal apparatus 200 may be implemented as a module (e.g. integrated circuit module constituted with a single die) that is mounted on these terminals.

5.1. Application Examples for Base Station

First Application Example

Figure 17:
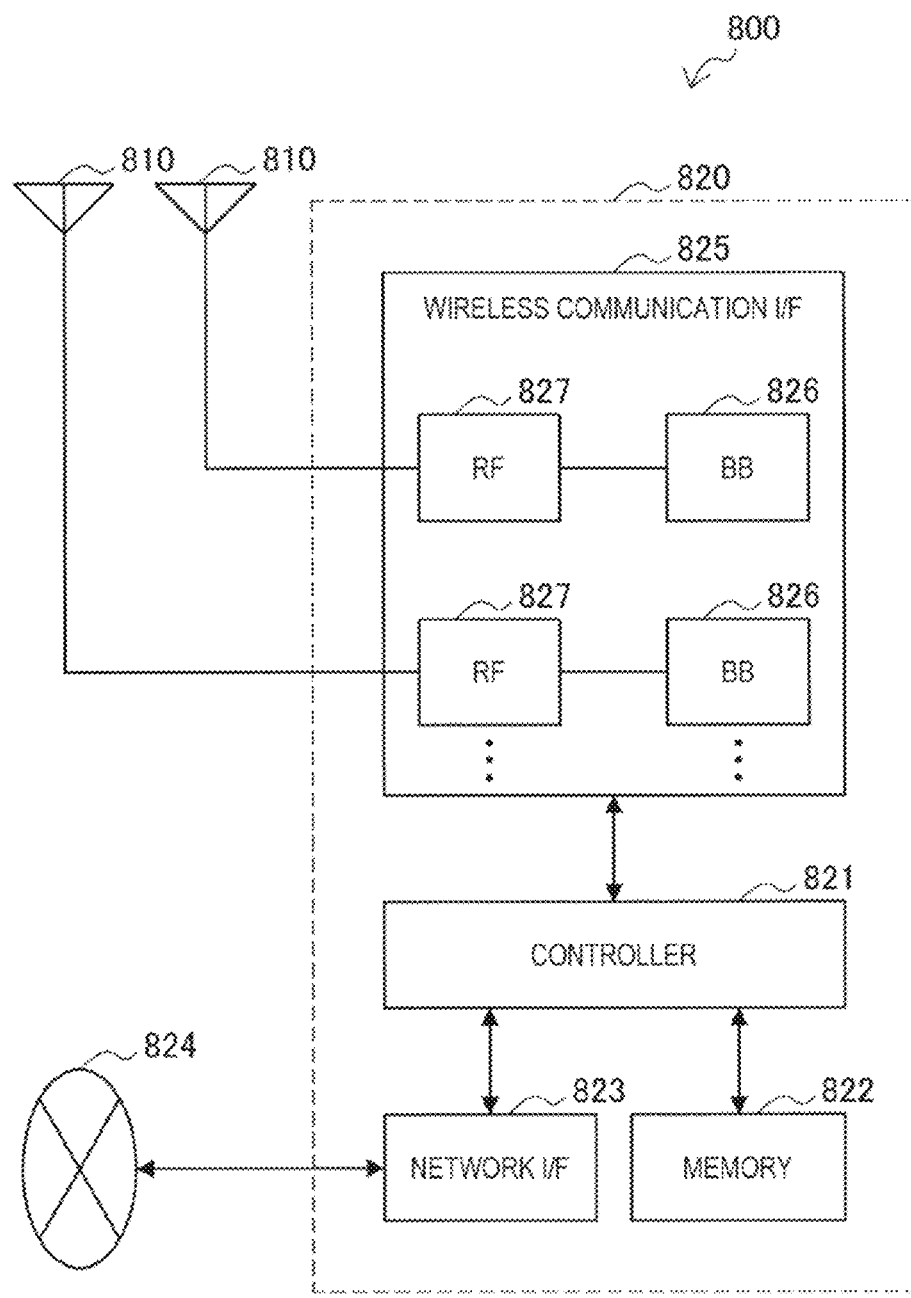
FIG. 17 is a block diagram illustrating a first example of a schematic configuration of an eNB.

FIG. 17 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 17, and the plurality of antennas 810 may, for example, correspond to a plurality of frequency bands used by the eNB 800. It should be noted that while FIG. 17 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. In addition, the controller 821 may also have a logical function of performing control such as radio resource control, radio bearer control, mobility management, admission control, and scheduling. The control may be performed in cooperation with a surrounding eNB or a core network. In addition, the memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. In addition, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 17, and the plurality of BB processors 826 may, for example, correspond to a plurality of frequency bands used by the eNB 800. In addition, the wireless communication interface 825 may also include a plurality of the RF circuits 827, as illustrated in FIG. 17, and the plurality of RF circuits 827 may, for example, correspond to a plurality of antenna elements. Note that, FIG. 17 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 17, one or more components included in the processing unit 150 (the setting unit 151 and/or the communication control unit 153) described above with reference to FIG. 7 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the eNB 800, and the wireless communication interface 825 (for example, the BB processor 826) and/or the controller 821 may execute the program. As described above, the eNB 800, the base station apparatus 820, or the module may be provided as an apparatus including the above-described one or more components, and the program causing the processor to function as the above-described one or more components may be provided. In addition, a readable recording medium in which the program is recorded may be provided.

In addition, in the eNB 800 shown in FIG. 17, the wireless communication unit 120 described with reference to FIG. 7 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. In addition, the storage unit 140 may be implemented by the memory 822.

Second Application Example

Figure 18:
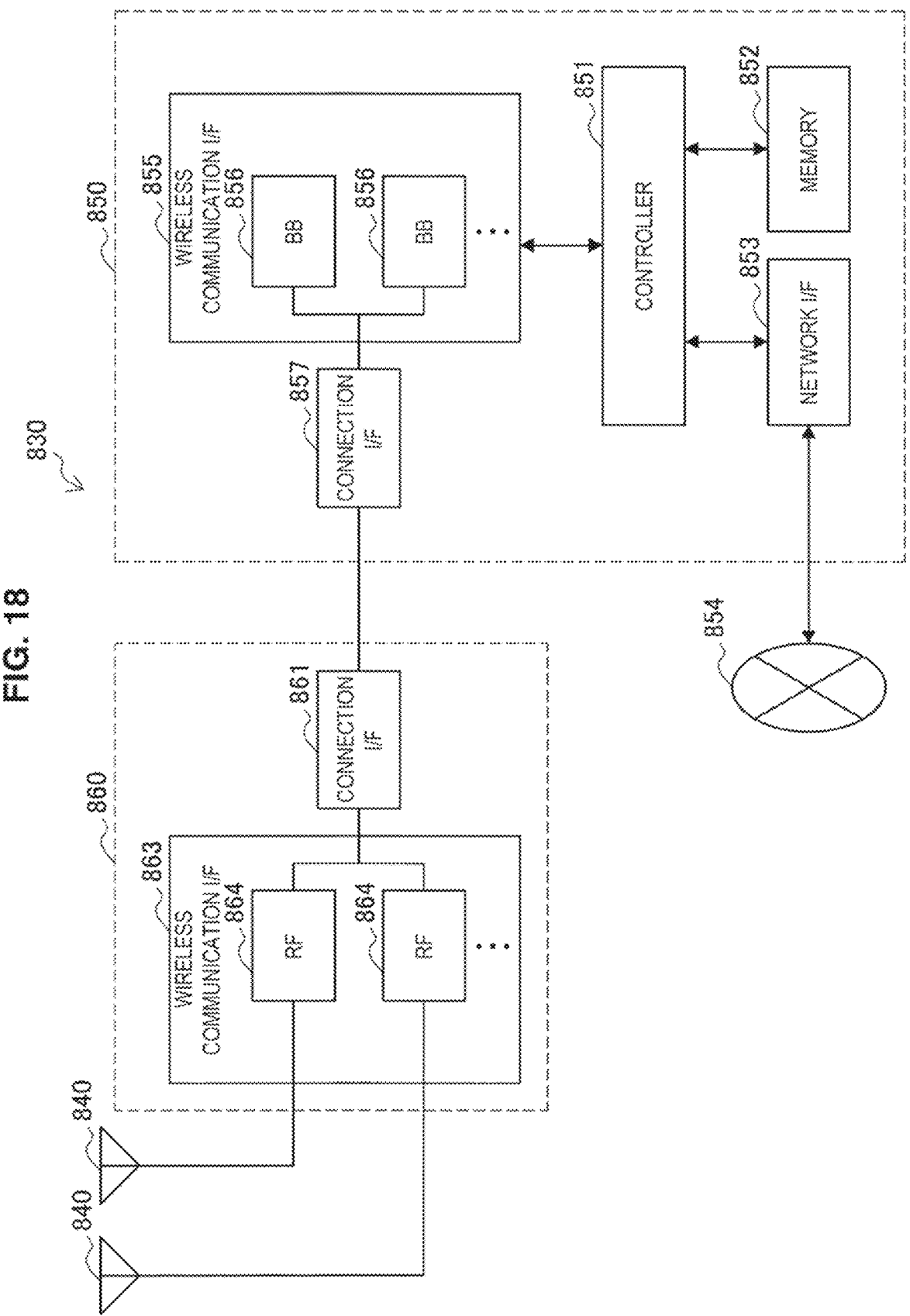
FIG. 18 is a block diagram illustrating a second example of the schematic configuration of the eNB.

FIG. 18 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. In addition, the base station apparatus 850 and the RRH 860 may be connected to each other by a high speed line such as optical fiber cables.

Each of the antennas 840 includes a single or a plurality of antenna elements (e.g. plurality of antenna elements constituting a MIMO antenna), and is used for the RRH 860 to transmit and receive a wireless signal. The eNB 830 may include a plurality of the antennas 840 as illustrated in FIG. 18, and the plurality of antennas 840 may, for example, correspond to a plurality of frequency bands used by the eNB 830. Note that, FIG. 18 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 17.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 17 except that the BB processor 856 is connected to an RF circuit 864 of the RRH 860 via the connection interface 857. The wireless communication interface 855 may include a plurality of the BB processors 856, as illustrated in FIG. 18, and the plurality of BB processors 856 may, for example, correspond to a plurality of frequency bands used by the eNB 830 respectively. Note that, FIG. 18 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 and the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 18, and the plurality of RF circuits 864 may, for example, correspond to a plurality of antenna elements. Note that, FIG. 18 illustrates an example in which the wireless communication interface 863 includes the plurality of RF circuits 864, but the wireless communication interface 863 may include the single RF circuit 864.

In the eNB 830 illustrated in FIG. 18, one or more components included in the processing unit 150 (the setting unit 151 and/or the communication control unit 153) described above with reference to FIG. 7 may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the eNB 830, and the wireless communication interface 855 (for example, the BB processor 856) and/or the controller 851 may execute the program. As described above, the eNB 830, the base station apparatus 850, or the module may be provided as an apparatus including the above-described one or more components, and the program causing the processor to function as the above-described one or more components may be provided. In addition, a readable recording medium in which the program is recorded may be provided.

In addition, for example, in the eNB 830 shown in FIG. 18, the wireless communication unit 120 described with reference to FIG. 7 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. In addition, the storage unit 140 may be implemented by the memory 852.

5.2. Application Examples for Terminal Apparatus

First Application Example

Figure 19:
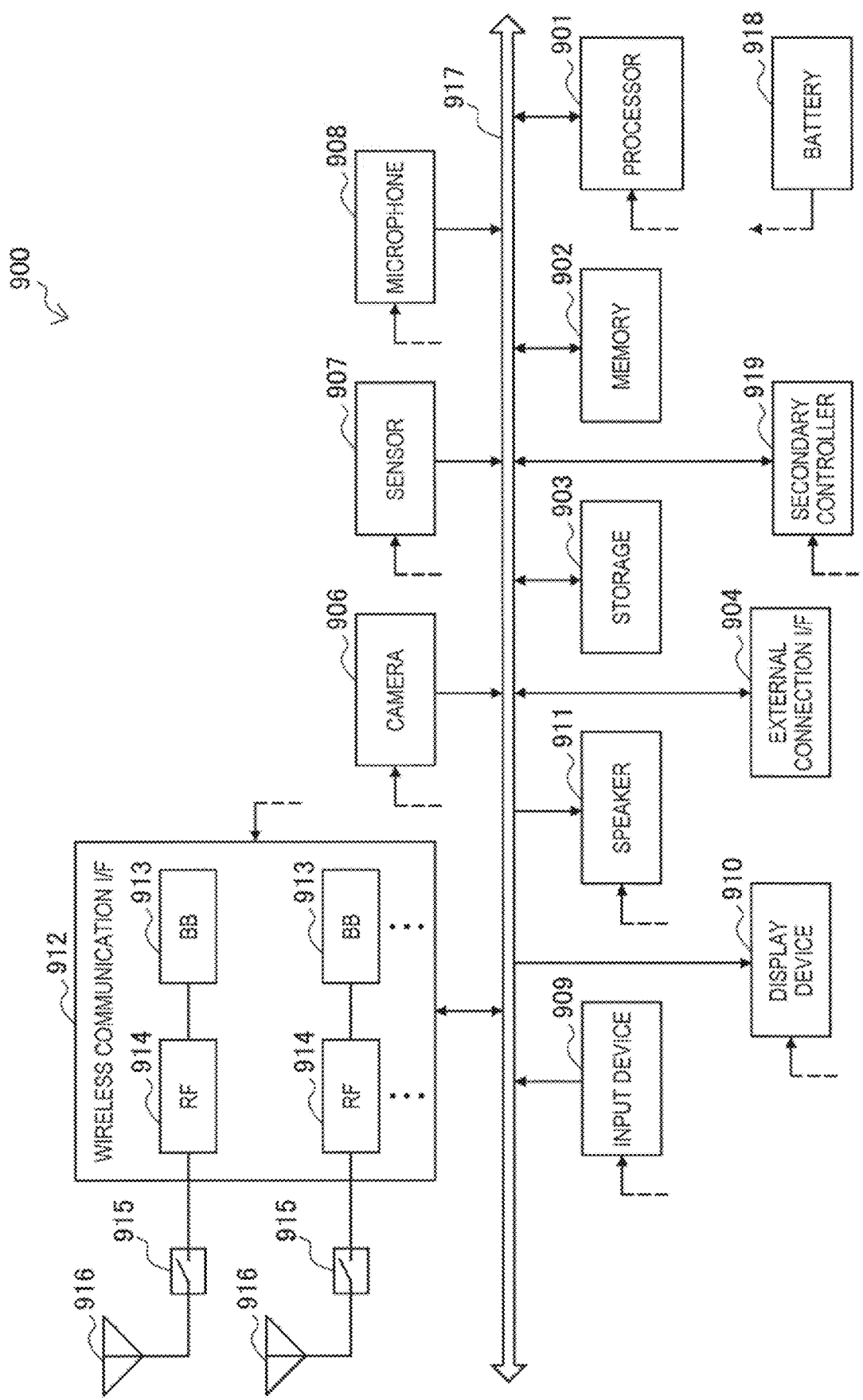
FIG. 19 is a block diagram illustrating an example of a schematic configuration of a smartphone.

FIG. 19 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor, and the like. The microphone 908 converts a sound that is input into the smartphone 900 to an audio signal. The input device 909 includes, for example, a touch sensor which detects that a screen of the display device 910 is touched, a key pad, a keyboard, a button, a switch, or the like, and accepts an operation or an information input from a user. For example, the display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 19. Note that, FIG. 19 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 19. Note that, FIG. 19 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 19 via a feeder line that is partially illustrated in the figure as a dashed line. The secondary controller 919, for example, operates a minimally necessary function of the smartphone 900 in a sleep mode.

In the smartphone 900 illustrated in FIG. 19, one or more components included in the processing unit 240 (the acquisition unit 241 and/or the measurement unit 243) described above with reference to FIG. 8 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the smartphone 900, and the wireless communication interface 912 (for example, the BB processor 913), the processor 901, and/or the secondary controller 919 may execute the program. As described above, the smartphone 900 or the module may be provided as an apparatus including the above-described one or more components, and the program causing the processor to function as the above-described one or more components may be provided. In addition, a readable recording medium in which the program is recorded may be provided.

In addition, for example, in the smartphone 900 shown in FIG. 19, the wireless communication unit 220 described with reference to FIG. 8 may be implemented by the wireless communication interface 912 (for example, the RF circuit 914). Moreover, the antenna unit 210 may be implemented by the antenna 916. In addition, the storage unit 230 may be implemented by the memory 902.

Second Application Example

FIG. 20 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, a barometric sensor, and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, a switch, or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 20. Note that, FIG. 20 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 20. Note that, FIG. 20 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 950 supplies electric power to each block of the car navigation apparatus 920 illustrated in FIG. 20 via a feeder line that is partially illustrated in the figure as a dashed line. In addition, the battery 950 accumulates the electric power supplied from the vehicle.

In the car navigation apparatus 920 illustrated in FIG. 20, one or more components included in the processing unit 240 (the acquisition unit 241 and/or the measurement unit 243) described above with reference to FIG. 8 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the car navigation apparatus 920, and the wireless communication interface 933 (for example, the BB processor 934) and/or the processor 921 may execute the program. As described above, the car navigation apparatus 920 or the module may be provided as an apparatus including the above-described one or more components, and the program causing the processor to function as the above-described one or more components may be provided. In addition, a readable recording medium in which the program is recorded may be provided.

In addition, for example, in the car navigation apparatus 920 shown in FIG. 20, the wireless communication unit 220 described with reference to FIG. 8 may be implemented by the wireless communication interface 933 (for example, the RF circuit 935). Moreover, the antenna unit 210 may be implemented by the antenna 937. In addition, the storage unit 230 may be implemented by the memory 922.

In addition, the technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the acquisition unit 241 and the measurement unit 243. The vehicle module 942 generates vehicle data such as vehicle speed, engine speed, and trouble information, and outputs the generated data to the in-vehicle network 941.

6. CONCLUSION

The embodiment of the present disclosure has been described above in detail with reference to FIGS. 1 to 20. As described above, the terminal apparatus feeds back the CQI of the serving base station, which has been calculated on the basis of the results of measuring the reference signals received from the serving base station and the neighbor base station and the information related to Pc of the neighbor base station. In this manner, it becomes possible to feed back the CQI in consideration of the difference in the received power between the reference signal and the data signal related to the CSI-RS from the neighbor base station and to perform selection and the like of a more appropriate modulation scheme by the serving base station.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the technical features that have been described in the respective embodiments described above can be appropriately combined.

In addition, the processing described by using the flowcharts and the sequence diagrams in this specification may not necessarily executed in the orders described in the drawings. Some processing steps may be executed in parallel. In addition, additional processing steps may be employed, and a part of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

a processing unit that feeds back a channel quality indicator (CQI) of a serving base station, which is calculated on a basis of results of measuring reference signals received from the serving base station and a neighbor base station and information related to a power difference between the reference signal and a data signal of the neighbor base station, to the serving base station.

(2)

The apparatus according to (1), in which the information related to the difference includes information related to an assumed ratio of an energy per resource element (EPRE) of the data signal with respect to an EPRE of the reference signal of the neighbor base station.

(3)

The apparatus according to (2), in which the information related to the difference includes information that indicates the ratio corresponding to at least a part of an interference measurement resource (IMR), and the reference signal of the neighbor base station is received by the IMR corresponding to the ratio of the reference signal.

(4)

The apparatus according to (3), in which one or more reference signals are received by the IMR.

(5)

The apparatus according to any one of (1) to (4), in which the information related to the difference includes information that indicates a base station corresponding to each IMR, and the reference signal of the neighbor base station is received by a different IMR for each base station.

(6)

The apparatus according to any one of (1) to (5), in which the information related to the difference includes information that indicates restriction of a transmission schedule of the data signal in the neighbor base station in a predetermined period of time in future.

(7)

The apparatus according to (6), in which the information that indicates the restriction of the transmission schedule includes information that indicates whether or not each sub-band is used to transmit the data signal.

(8)

The apparatus according to (6) or (7), in which the information that indicates the restriction of the transmission schedule includes information that indicates whether or not each beam is used to transmit the data signal.

(9)

The apparatus according to any one of (6) to (8), in which the information related to the difference includes information that indicates the restriction of the transmission schedule corresponding to each IMR, and the reference signal of the neighbor base station is received by an IMR corresponding to the restriction of the transmission schedule of the neighbor base station.

(10)

The apparatus according to any one of (1) to (9), in which the reference signal is a channel state information reference signal (CSI-RS).

(11)

The apparatus according to any one of (1) to (10), in which the data signal is a signal that is transmitted through a physical downlink shared channel (PDSCH).

(12)

The apparatus according to any one of (1) to (11), in which the reference signal is subjected to beamforming.

(13)

An apparatus including:

a processing unit that provides a notification of information related to a power difference between a reference signal and a data signal of a neighbor base station to a terminal apparatus under the control of the apparatus and receives feedback of a CQI that is calculated on a basis of results of measuring reference signals that are received from a serving base station and the neighbor base station and information related to the difference from the terminal apparatus.

(14)

The apparatus according to (13), in which the processing unit provides a notification of information that indicates an assumed ratio of an EPRE of the data signal with respect to an EPRE of the reference signal, which corresponds to each IMR, to the neighbor base station.

(15)

The apparatus according to (14), in which the processing unit provides a notification of information that indicates a position of the IMR to the neighbor base station.

(16)

The apparatus according to any of (13) to (15), in which the processing unit acquires information related to a transmission schedule of the reference signal from the neighbor base station.

(17)

The apparatus according to (16), in which the processing unit acquires information that indicates an assumed ratio of the EPRE of the data signal with respect to the EPRE of the reference signal of the neighbor base station.

(18)

The apparatus according to any one of (13) to (17), in which the processing unit controls whether or not to provide the notification of the information related to the difference to the terminal apparatus.

(19)

The apparatus according to any one of (13) to (18), in which the processing unit acquires information that indicates restriction of a transmission schedule of the data signal in the neighbor base station in a predetermined period of time in future from the neighbor base station.

(20)

A method including:

feeding back a channel quality indicator (CQI) of a serving base station, which is calculated on a basis of results of measuring reference signals received from the serving base station and a neighbor base station and information related to a power difference between the reference signal and a data signal of the neighbor base station, to the serving base station.

(21)

A method including:

providing, by a processor, a notification of information related to a power difference between a reference signal and a data signal of a neighbor base station to a terminal apparatus under the control of the apparatus and receiving feedback of a CQI that is calculated on a basis of results of measuring reference signals that are received from a serving base station and the neighbor base station and information related to the difference from the terminal apparatus.

(22)

A program causing a computer to function as:

a processing unit that feeds back a channel quality indicator (CQI) of a serving base station, which is calculated on a basis of results of measuring reference signals received from the serving base station and a neighbor base station and information related to a power difference between the reference signal and a data signal of the neighbor base station, to the serving base station.

(23)

A program causing a computer to function as:

an apparatus including:

a processing unit that provides a notification of information related to a power difference between a reference signal and a data signal of a neighbor base station to a terminal apparatus under the control of the apparatus and receives feedback of a CQI that is calculated on a basis of results of measuring reference signals that are received from a serving base station and the neighbor base station and information related to the difference from the terminal apparatus.

REFERENCE SIGNS LIST

1 system
100 base station
110 antenna unit
120 wireless communication unit
130 network communication unit
140 storage unit
150 processing unit
151 setting unit
153 communication control unit
200 terminal apparatus
210 antenna unit
220 wireless communication unit
230 storage unit 240 processing unit
241 acquisition unit
243 measurement unit
300 neighbor base station

The invention claimed is:

1. An apparatus comprising:
processing circuitry configured to
acquire scheduling information from another apparatus;
measure a first reference signal non-zero-power (NZP) CSI-RS received from the serving base stations for channel measurement;
measure a second reference signal CSR-RS received for interference measurement; and
feed back channel status information including a channel quality indicator (CQI), which is based on a ratio of PDSCH energy per resource element (EPRE) to CSI-RS EPRE,
wherein the CQI is reported for each sub-band when a certain condition concerning a data signal is satisfied.

2. The apparatus according to claim 1,
wherein the processing circuitry is further configured to acquire information that indicates the ratio corresponding to at least a part of an interference measurement resource (IMR), and
the reference signal of the neighbor base station is received by the IMR corresponding to the ratio of the reference signal.

3. The apparatus according to claim 1,
wherein the processing circuitry is further configured to acquire information that indicates restriction of a transmission schedule of the data signal in the neighbor base station in a predetermined period of time in future.

4. The apparatus according to claim 3,
wherein the information that indicates the restriction of the transmission schedule includes information that indicates whether or not each sub-band is used to transmit the data signal.

5. The apparatus according to claim 3,
wherein the information that indicates the restriction of the transmission schedule includes information that indicates whether or not each beam is used to transmit the data signal.

6. The apparatus according to claim 3,
wherein the information that indicates the restriction of the transmission schedule includes information that indicates the restriction of the transmission schedule corresponding to each IMR, and
the reference signal of the neighbor base station is received by an IMR corresponding to the restriction of the transmission schedule of the neighbor base station.

7. The apparatus according to claim 1,
wherein the first and second reference signals are subjected to beamforming.

8. The apparatus according to claim 1, wherein the processing circuitry is further configured to estimate the CQI for each sub-band on the basis of the scheduling information acquired from said another apparatus.

9. The apparatus according to claim 8, wherein the sub-band is a frequency band that includes a plurality of sub-carriers or a frequency band that is obtained by dividing a component carrier to a plurality of parts.

10. An apparatus comprising:
processing circuitry configured to
provide scheduling information to another apparatus; and
receive feedback channel status information including channel quality indicator (CQI), which is derived based on a ratio of PDSCH energy per resource element (EPRE) to CSI-RS EPRE, and the CQI is reported for each sub-band when a certain condition concerning a data signal is satisfied.

11. The apparatus according to claim 10,
wherein the processing circuitry is further configured to provide information that indicates a position of the IMR to the neighbor base station.

12. The apparatus according to claim 10,
wherein the processing circuitry is further configured to acquire information related to a transmission schedule of the reference signal from the neighbor base station.

13. The apparatus according to claim 10,
wherein the processing is further configured to acquire information that indicates restriction of a transmission schedule of the data signal in the neighbor base station in a predetermined period of time in future from the neighbor base station.

14. The apparatus according to claim 10, wherein the CQI for each sub-band is estimated on the basis of the schedule information.

15. The apparatus according to claim 14, wherein the sub-band is a frequency band that includes a plurality of sub-carriers or a frequency band that is obtained by dividing a component carrier to a plurality of parts.

16. A method comprising:
acquiring scheduling information from another apparatus;
measuring a first reference signal non-zero-power (NZP) CSI-RS received from the serving base stations for channel measurement;
measuring a second reference signal CSR-RS received for interference measurement; and
feeding back channel status information including a channel quality indicator (CQI) of a serving base station, which is based on a ratio of PDSCH energy per resource element (EPRE) to CSI-RS EPRE,
wherein the CQI is reported for each sub-band when a certain condition concerning a data signal is satisfied.

* * * * *

UNITED STATES PATENT AND TRADEMARK OFFICE
CERTIFICATE OF CORRECTION

| | | |
|---|---|---|
| PATENT NO. | : 11,750,259 B2 | Page 1 of 1 |
| APPLICATION NO. | : 16/936453 | |
| DATED | : September 5, 2023 | |
| INVENTOR(S) | : Hiroaki Takano | |

It is certified that error appears in the above-identified patent and that said Letters Patent is hereby corrected as shown below:

In the Claims

Column 33, Line 12, In Claim 1, should be changed "measure a second reference signal CSR-RS received for" to -- measure a second reference signal CSI-RS received for --;

Column 34, Line 44, In Claim 16, should be changed "measuring a second reference signal CSR-RS received for" to -- measuring a second reference signal CSI-RS received for --.

Signed and Sealed this
Tenth Day of October, 2023

Katherine Kelly Vidal
*Director of the United States Patent and Trademark Office*